United States Patent
Ruehle

(10) Patent No.: US 7,899,904 B2
(45) Date of Patent: Mar. 1, 2011

(54) HARDWARE PROCESSING OF REGULAR EXPRESSIONS

(75) Inventor: Michael D. Ruehle, Albuquerque, NM (US)

(73) Assignee: LSI Corporation, Milpitas, CA (US)

( * ) Notice: Subject to any disclaimer, the term of this patent is extended or adjusted under 35 U.S.C. 154(b) by 455 days.

(21) Appl. No.: 12/112,988

(22) Filed: Apr. 30, 2008

(65) Prior Publication Data
US 2008/0270342 A1 Oct. 30, 2008

Related U.S. Application Data

(60) Provisional application No. 60/915,055, filed on Apr. 30, 2007.

(51) Int. Cl.
*G06F 13/00* (2006.01)
(52) U.S. Cl. .................. 709/224; 709/200; 712/300
(58) Field of Classification Search ............... 709/223, 709/224, 200; 712/37, 300
See application file for complete search history.

(56) References Cited

U.S. PATENT DOCUMENTS

| | | | |
|---|---|---|---|
| 3,568,156 A | 3/1971 | Thompson et al. | |
| 6,202,064 B1 | 3/2001 | Julliard | |
| 6,216,131 B1 | 4/2001 | Liu et al. | |
| 6,275,574 B1 | 8/2001 | Oran | |
| 6,295,562 B1 * | 9/2001 | Wong | 710/5 |
| 6,327,561 B1 | 12/2001 | Smith et al. | |
| 6,446,098 B1 | 9/2002 | Iyer et al. | |
| 6,477,571 B1 | 11/2002 | Ross | |
| 6,487,666 B1 | 11/2002 | Shanklin et al. | |
| 6,496,835 B2 | 12/2002 | Liu et al. | |
| 6,569,208 B2 | 5/2003 | Iyer et al. | |
| 6,636,594 B1 | 10/2003 | Oran | |
| 6,675,162 B1 | 1/2004 | Russell-Falla et al. | |
| 6,856,981 B2 | 2/2005 | Wyschogrod et al. | |
| 7,180,895 B2 | 2/2007 | Smith et al. | |
| 7,254,632 B2 | 8/2007 | Zeira et al. | |
| 7,500,049 B2 * | 3/2009 | Dixon et al. | 711/101 |
| 2002/0103831 A1 | 8/2002 | Iyer et al. | |
| 2002/0116419 A1 | 8/2002 | Iyer et al. | |
| 2003/0051043 A1 | 3/2003 | Wyschogrod et al. | |
| 2003/0123447 A1 | 7/2003 | Smith et al. | |
| 2003/0135653 A1 | 7/2003 | Marovich | |
| 2003/0204584 A1 | 10/2003 | Zeira et al. | |
| 2005/0273450 A1 | 12/2005 | McMillen et al. | |

OTHER PUBLICATIONS

Mastering Regular Expressions, 2$^{nd}$ Ed. J.E.F. Friedl, *O'Reilly Media Inc.*, Cambridge 2002.
Principles, Techniques, and Tools; J.D. Ullman, A. V. Aho, and R. Sethi, *Addison-Wesley Longman, Inc.* 1985.
Lex & yacc, 2$^{nd}$ Ed. T. Mason, J. Levine, and D. Brown, *O'Reilly Media Inc.*, 1992.

* cited by examiner

Primary Examiner—Viet Vu

(57) ABSTRACT

A system and method for hardware processing of regular expressions is disclosed. A register bank is loaded with state information associated with one or more states of a state machine. State information such as transitions and spin counts are updated as characters of an input data stream are processed. A crossbar is used to interconnect the states stored in the register bank.

22 Claims, 23 Drawing Sheets

REGULAR
EXPRESSION: /[abcd]*[abef][aceg]h/   ← 110

NFA:   ← 120

DFA:  ← 130

REGULAR
EXPRESSION: /[abcd]*[abef][aceg]h/ ← 110

NFA: ← 120

DFA: ← 130

Input: "aech"

NFA (software):

S0 : a → S1
S1 : e → S2
S2 : c → failure, backup
S1 : e → backup
S0 : a → S0
S0 : e → S1
S1 : c → S2
S2 : h → S3 Token

↓
210

DFA:

D0 : a → D1
D1 : e → D5
D5 : c → D6
D6 : h → D7 Token

220

REGULAR
EXPRESSION: /[abcd]*[abef][aceg]h/  ← 110

NFA: ← 120

DFA: ← 130

312 → STATE TRANSITION CONDITIONS AND ACTIONS
       S0 :   [abef]  → S1
314 → S0 :   [abcd]  → S0                              } 310
       S1 :   [aceg]  → S2
       S2 :   h       → S3 (token)

320

| CYCLE | CHAR | ACTIVE STATE(S) |
|-------|------|-----------------|
|       |      | S0              |
| 1     | a    | S1, S0          |
| 2     | e    | S1, S2          |
| 3     | c    | S2              |
| 4     | h    | S3              |

FIG. 8B

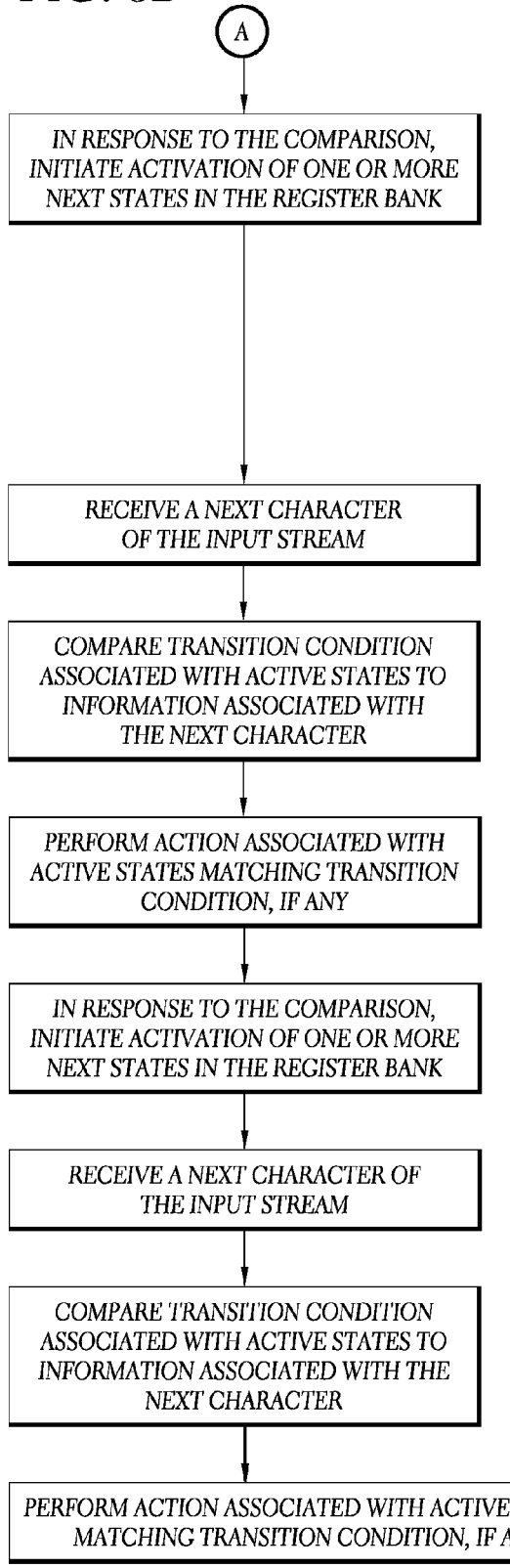

| State | | Transition Info | State Info | Status |
|---|---|---|---|---|
| 1 | S0a | Trans:[abef] ⟶ S1 | {0,} | I |
| 2 | S0b | Spin:[abcd] | {0,} | I |
| 3 | S1 | Trans:[aceg] ⟶ S2 | - | A |
| 4 | S2 | Trans:h ⟶ S3 (token) | - | A |
| 5 | - | - | - | I |
| * | - | - | - | I |
| N | - | - | - | I | c

"c" is in the character class
for transition to S2

No tokens / actions associated
with S1

| State | | Transition Info | State Info | Status |
|---|---|---|---|---|
| 1 | S0a | Trans:[abef] ⟶ S1 | {0,} | I |
| 2 | S0b | Spin:[abcd] | {0,} | I |
| 3 | S1 | Trans:[aceg] ⟶ S2 | - | I |
| 4 | S2 | Trans:h ⟶ S3 (token) | - | A |
| 5 | - | - | - | - |
| * | - | - | - | - |
| N | - | - | - | - | h

"h" is the character indicating a transition
to S2 and outputting of an associated token Output the token

*Binary example:*

Regular expression: "ab{3,5}c"   — 910

NFA:

— 920

Input text: "abbcabbbbc"

— 930

| Input Char | Slot 1 | Slot 2 |
|---|---|---|
| 1 | a | S0 ACT ⟶ S1 | |
| 2 | b | S0 ACT | S1 [0] spin |
| 3 | b | S0 ACT | S1 [1] spin |
| 4 | c | S0 ACT | S1 [2] |
| 5 | a | S0 ACT ⟶ S1 | S1 - |
| 6 | b | S0 ACT | S1 [0] spin |
| 7 | b | S0 ACT | S1 [1] spin |
| 8 | b | S0 ACT | S1 [2] spin |
| 9 | b | S0 ACT | S1 [3] spin |
| 10 | c | S0 ACT | S1 [4] token |

*Vector example:*

Regular expression:  "a.{2,3}bc"  ───  1010

NFA:   ───  1020

Start
(permanent)

Input text:  "aabcabcbcb"

1030

| | Input Char | Slot 1 | Slot 2 | Slot 3 |
|---|---|---|---|---|
| 1 | a | S0 ACT ⟶ S1 | | |
| 2 | a | S0 ACT ⟶ S1 | S1 [1000] spin | |
| 3 | b | S0 ACT | S1 [1100] spin | |
| 4 | c | S0 ACT | S1 [0110] spin | |
| 5 | a | S0 ACT ⟶ S1 | S1 [0011] spin | |
| 6 | b | S0 ACT | S1 [1001] spin, ⟶ S2 | |
| 7 | c | S0 ACT | S1 [0100] spin | S2 ACT token |
| 8 | b | S0 ACT | S1 [0010] spin, ⟶ S2 | S2 - |
| 9 | c | S0 ACT | S1 [0001] spin | S2 ACT token |
| 10 | b | S0 ACT | S1 - | S2 - |

"aaech"  ← 1110

1120

| | /1102 | /1104 | /1106 | /1115 | /1108 | |
|---|---|---|---|---|---|---|
| | Active / Inactive | Spin | State | Crossbar | Transition States | |
| | A | 1 | S0 | → | S0 | } 1130 |
| | A | X | S1 | → | S1 | |
| | | | | | | |
| | | | | | | |

"[a] a e c h"  ← 1110

← 1120

"a a e c h"  ← 1110

| /1102 | /1104 | /1106 | /1115 | /1108 | |
|---|---|---|---|---|---|
| Active / Inactive | Spin | State | Crossbar | Transition States | |
| D | 0 | S0 | | S0 | ⎫ |
| D | X | S1 | | S1 | ⎬ 1130 |
| A | X | S2 | | S2 | ⎭ |
| | | | | | |

" a a e [c] h "    ← 1110 abcd ⟲ (S0) —abef→ (S1) —aceg→ (S2) —h→ (S3)    ← 1120

HARDWARE PROCESSING OF REGULAR EXPRESSIONS

CROSS-REFERENCE TO RELATED APPLICATIONS

This application claims the benefit under 35 U.S.C. 119(e) of U.S. Provisional Application No. 60/915,055, filed on Apr. 30, 2007, which is incorporated by reference in its entirety.

BACKGROUND OF THE INVENTION

1. Field of the Invention

This application generally relates to the processing of regular expressions.

2. Description of Related Technology

When data that is transmitted across a network, such as the Internet, arrives at a server, having survived all the routing, processing, and filtering that may have occurred in the network, it may be further processed. This further processing may occur all at once when the information arrives, as in the case of a web server. Alternatively, this processing may occur at stages, with a first one or more stages removing layers of protocol with one or more intermediate forms being stored on disk, for example. Later stages may also process the information when the original payload is retrieved, as with an e-mail server, for example. In such an information processing system, the need for high-speed processing becomes increasingly important due to the need to complete the processing in a network and also because of the volume of information that must be processed within a given time.

Regular expressions are well-known in the prior art and have been in use for some time for pattern matching and lexical analysis. An example of their use is disclosed by K. L. Thompson in U.S. Pat. No. 3,568,156, issued Mar. 2, 1971, which is hereby incorporated by reference in its entirety. U.S. patent application Ser. No. 10/851,482, filed on May 21, 2004, and entitled, "Regular Expression Acceleration Engine and Processing Model," is also hereby incorporated by reference in its entirety.

Contemporary applications use thousands to tens of thousands of regular expressions to detect attacks. When compiled into one or more state machines, for example, those expressions consume a great deal of instruction memory. Input data streams, such as content that is delivered via one or more networks, may be scanned by a software state machine engine that traverses the state machines in order to determine if the input data streams contain characters matching the original regular expressions. As those of skill in the art will recognize, as the quantity of regular expressions to be detected in input data streams increases (e.g. the quantity of viruses that a network server wants to detect) and the size of strings to be detected also increases (e.g., virus signatures), the suitability of software state machine engines decreases.

SUMMARY OF THE INVENTION

In one embodiment, a method of tracking active states of a nondeterministic state machine during a process of traversing states of the state machine in response to characters of an input data stream comprises (a) loading state information associated with one or more states of the state machine into a register bank and marking as active the state information of at least one state, the state information for each state comprising one or more transition conditions associated with the state and one or more next states associated with respective transition conditions. (b) determining a next character of the input stream, (c) accessing the transition conditions of only the currently active states in order to determine one or more transition conditions that are satisfied by the next character, (d) marking as active in the register bank state information associated with one or more next states associated with the satisfied transition conditions, (e) marking as inactive in the register bank state information associated with any next states that are not associated with one or more satisfied transition conditions, and (f) repeating steps (b)-(e) for each character of the input stream.

In one embodiment, a method of tracking a number of times a spin states of a nondeterministic state machine is sequentially accessed in response to respective transition conditions of the spin state matching sequential input characters of an input data stream comprises determining N bits of memory for tracking a spin count associated with the spin state, wherein N is greater than or equal to a predetermined quantity of accesses to the spin state that must occur in response to sequentially received input characters before a transition condition of the spin states is satisfied, setting a value of each of the N bits to a first value, receiving an input character matching a transition character indicating transition from the spin state to the spin state and, in response thereto, setting a first bit of the N bits to a second value, and in response to each sequentially received input character matching a transition character indicating a transition from the spin state to the spin state, setting a different bit of the N bits to a second value, wherein the bits set to the second value are indicative of one or more current spin counts associated with the spin state.

In one embodiment, an apparatus for detecting patterns in a data stream comprises a memory storing state information associated with one or more states of a state machine in respective memory locations of the memory, the state machine being configured to detect patterns in an input data stream, wherein the state information stored in the memory is updated as the state machine is traversed in response to characters of the input data stream, the state information for each state comprising one or more transition conditions associated with respective states and one or more next states associated with respective transition conditions, the memory further storing an activity indicator for the one or more states indicative of which of the one or more states is currently active in evaluation of the input data stream and a reconfigurable connection matrix configured to dynamically create logical connections between memory locations so that logical connections are created between memory locations associated with each of the currently active states and respective memory locations associated with the next states associated with the respective currently active states.

In one embodiment, an apparatus for evaluating a state machine in response to a data string comprises a register bank comprising a plurality of state slots configured to selectively store information associated with states of the state machine, a loader configured to selectively load state information associated with one or more states of the state machine into state slots of the register bank and to initiate marking of certain states as active and transition logic configured to access transition conditions associated with each of the states in the register bank that are marked as active, to determine one or more of the transition conditions that are satisfied by a next character of the data string, and to provide an indication of one or more next states indicate in the determined transition conditions to the loader, wherein the loader is configured to update the state information loaded in the register bank and the states that are marked as active based on the indication received from the transition logic.

BRIEF DESCRIPTION OF THE DRAWINGS

FIGS. 8A and 8B are flowcharts illustrating an exemplary process that is performed by hardware components in evaluating an exemplary input data stream against an NFA.

DETAILED DESCRIPTION OF CERTAIN INVENTIVE EMBODIMENTS

Figure 1:
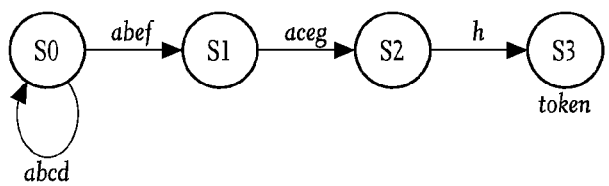
FIG. 1 illustrates a sample regular expression, a corresponding nondeterministic finite automaton ("NFA") and deterministic finite automaton ("DFA").
Figure 1:
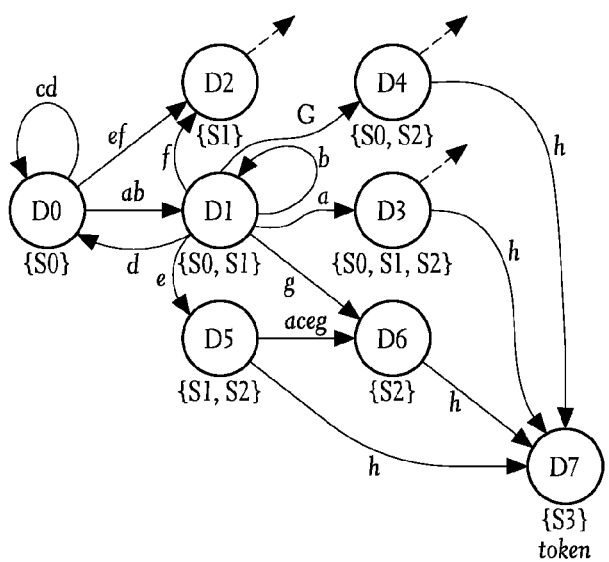

The following description is directed to certain specific embodiments of the invention. However, the invention can be embodied in a multitude of different ways as defined and covered by the claims. In this description, reference is made to the drawings wherein like parts are designated with like numerals throughout.

In certain embodiments described herein, inspection of packet content beyond only the packet header may be performed using high speed hardware that can look at all the bytes in a packet using a programmable state machine engine. In one embodiment, a compiler converts a set of regular expressions into one or more deterministic finite automata (DFA) comprising multiple states, and a state machine engine executes the DFA created by the compiler in response to characters of an input stream.

Regular expressions typically comprise terms and operators. A term may include a single symbol or multiple symbols combined with operators. Terms may also be recursive, so a single term may include multiple terms combined by operators. In dealing with regular expressions, three operations are defined, namely, juxtaposition, disjunction, and closure. In more modern terms, these operations are referred to as concatenation, selection, and repetition, respectively. Concatenation is implicit, one term is followed by another. Selection is represented by the logical OR operator which may be signified by a symbol, such as '|'. When using the selection operator, either term to which the operator applies will satisfy the expression. Repetition is represented by '*' which is often referred to as a Kleene star. The Kleene star, or other repetition operator, specifies zero or more occurrences of the term upon which it operates. Parentheses may also be used with regular expressions to group terms. Description of certain other regular expression nomenclatures is provided below.

A "character class" is a set of characters that will find a match if any one of the characters included in the set matches. For example, the character class [A-Z0-9#$%] matches any single character from A-Z, 0-9, or the characters "#", "$", and "%". Similarly, the character class [aeiou] matches any single character included in the specified set of characters, i.e., any vowel in the English language.

A "universal character class" matches any characters in an available character set. For example, a universal character class may be represented using [\x00-\xFF] (assuming characters are represented using 8 bits) or ".".

A "negated character class" is a set of characters that will find a match if any one of the characters not included in the set matches. For example, the character class [^aeiou] matches any single character not in the character class [aeiou].

A "repetition operator" will repeat a character class a specified number of times. For example, the repetition operator {3} will find a match if the character class preceding the repetition operator is repeated three times. Repetition operators may also include a range, such as {x,y}, indicating that in order to find a match the character class preceding the repetition operator must be repeated at least x but not more than y times. A repetition operator may comprise a range having only a lower boundary, e.g., {5,} or a zero lower boundary, e.g., {0,50}.

An "atom" is a combination of a character class and optional repetition operator. For example, the expression "[A-Z]{1,5}" is an atom comprising the character class [A-Z] and the repetition operator {1,5}. This atom matches any string of from 1 to 5 characters in the character class [A-Z]. A "byte counting atom" is a specific type of atom that uses the universal character class. It may be expressed as ".{1,5}", for example. An atom with a repetition operator, e.g., "[A-Z]{3,7}", is also referred to herein as a "spin expression" or a "spinning expression."

An "alternation operator" is used to specify alternatives in a regular expression. In certain embodiments, the characters "|" or "or" represent alternation operators.

An "expression" is a concatenation of one or more atoms with optional alternation and grouping. For example, "gray|grey" is an expression including two atoms and an alternation operator.

A "subexpression" comprises one or more contiguous atoms or grouped atoms that are a proper subset of an expression. For example, "gray|grey" comprises two subexpressions "gray" and "grey".

A "spinning state" is a state associated with a spin expression, such that one or more characters result in a transition to the same state (a "spin"). For example, the NFA states associated with the spin expressions [xyz]{5,20} and [−9876]{5,} are each spinning states.

A "state explosion expression" is any one or more of multiple expressions that results in multiple DFA states corresponding to a single NFA state. Spin expressions are an example of state explosion expressions. As described in further detail below, state explosion expressions potentially result in DFAs having a quantity of states that is prohibitively large for storage in suitable memory devices. Accordingly, improved systems and methods for evaluating state explosion expression are desired.

FIG. 1 illustrates a sample regular expression 110, a corresponding nondeterministic finite automaton ("NFA") 120 and deterministic finite automaton ("DFA") 130. In the embodiment of FIG. 1, the regular expression 110 defines search criteria that will match input data that begins with any number of characters from the character class [abcd], followed by a single character from the character class [abef], followed by a single character from the character class [aceg], followed by the character h. Thus, the regular expression comprises a spin expression, e.g., [abcd]*, where the * indicates that any number of the preceding character class matches the constraint, that results in a DFA 130 with many more states than the corresponding NFA 120. In the embodiment of FIG. 1, the input streams comprising the characters "bach" and "bababbbbaaaaddddach", for example, would each match the regular expression, while the characters "ebach" and "back", for example, would not match the regular expression.

The exemplary NFA 120 comprises a state S0 that either loops to itself upon receiving a character from the character class [abcd] or transitions to a state S1 upon receiving a character from the character class [abef]. The multiple possible transitions from state S1 of the NFA 120 upon receiving characters 'a' or 'b' illustrate the nondeterminism of the NFA 120. From state S1, the state machine transitions to state S2 upon receiving a character from the character class [abef], and becomes inactive in response to receiving any other characters. Finally, from state S2, the state machine transitions to state S3 upon receiving the character 'h', and becomes inactive in response to receiving any other character. In one embodiment, the state S3 may be associated with an output action, such as outputting a token indicating a match of the regular expression.

The exemplary DFA 130 illustrates only a portion of the transitions in a DFA that represents the regular expression 110. As illustrated in FIG. 1, the DFA 130 comprises many additional states and state transitions when compared to the NFA 120, in large part due to the spin expression '[abcd]*'. When this spin expression is converted to a DFA, state explosion occurs as additional states and transitions are necessary to fully match all possible input character combinations. Because a DFA includes only one possible transition for any combination of current state and input symbol, DFAs are desirable for implementation of regular expression functionality in software or hardware. However, when regular expressions comprising state explosion expressions are converted to corresponding DFAs, the size of the DFAs are very large, to the point that some regular expression functions produce DFAs that are too large to be executed on existing computing systems. Provided below is a description of systems and methods that reduce the memory requirements necessary for matching state explosion expressions, such as processing of such NFA's (and/or DFA's) in hardware.

Figure 2:
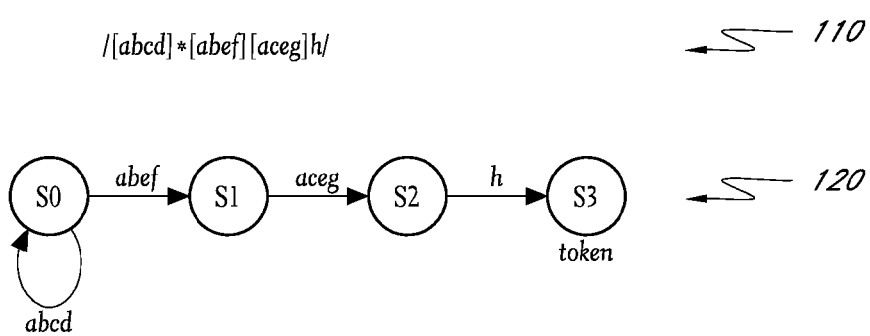
FIG. 2 illustrates the regular expression, the NFA, and the DFA of FIG. 1, as well as exemplary steps that are performed in evaluating an input stream.
Figure 2:
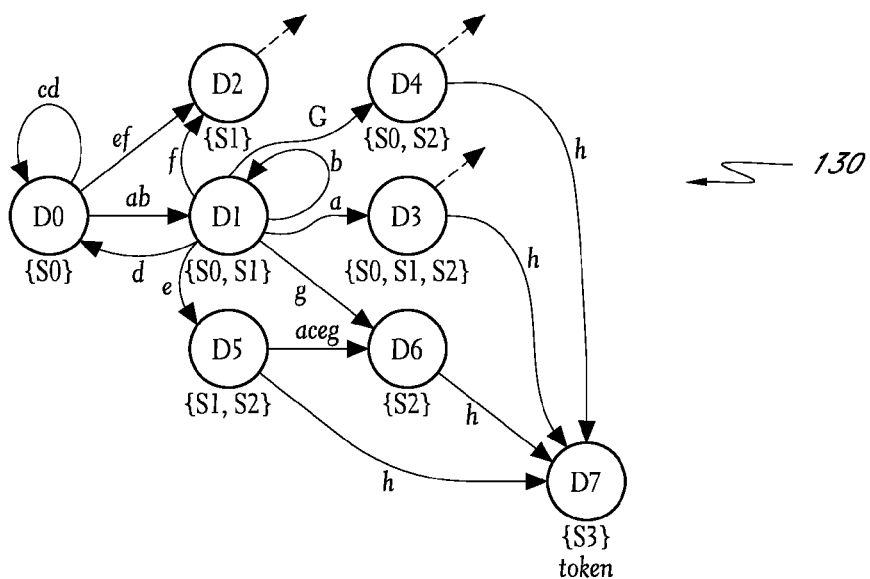
Figure 2:
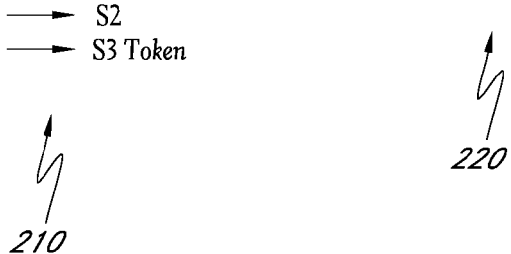

FIG. 2 illustrates the regular expression, the NFA, and the DFA of FIG. 1, as well as exemplary steps that are performed in evaluating an input stream comprising the characters "aech" using the NFA 120 and the DFA 130. More particularly, steps for evaluating the input characters using the NFA 120, such as may be performed using a software evaluation engine, are illustrated in column 210, while steps for evaluating the input characters using the DFA 130 are illustrated in column 220. As shown in FIG. 2, evaluation using the NFA 120 comprises eight steps, including a failure and multiple backup steps. Evaluation of the DFA 220 requires only four transitions, but storage of the additional states of the DFA 130 requires additional memory, which may quickly prohibit DFAs including such state explosion expressions from being stored in a reasonably sized memory.

Figure 3:
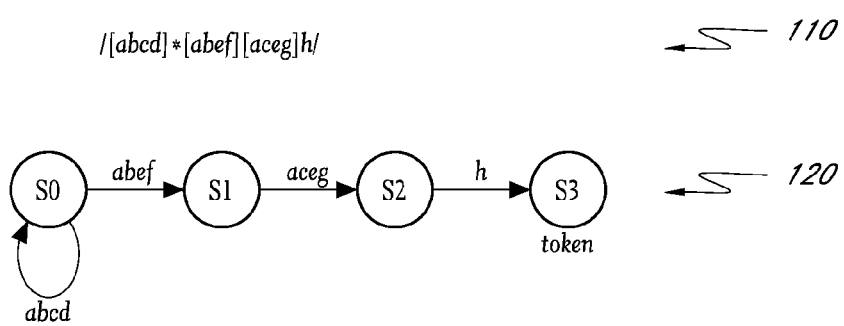
FIG. 3 illustrates the regular expression, the NFA, and the DFA of FIG. 1, as well as information associated with an alternative method of evaluating the regular expression.
Figure 3:
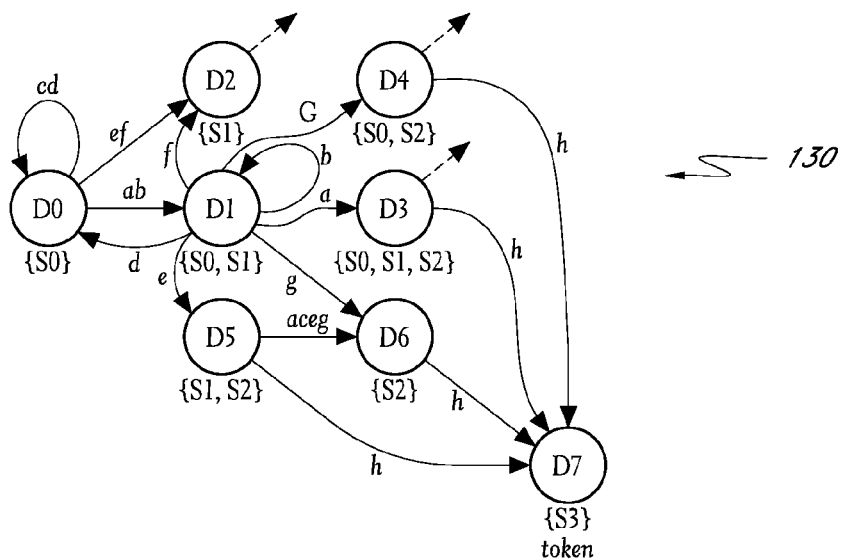

FIG. 3 illustrates the regular expression 110, NFA 120, and DFA 130 of FIG. 1, as well as information associated with an alternative method of evaluating the regular expression based on the received exemplary input characters "aech". In the embodiment of FIG. 3, information regarding transition conditions and actions associated with states of the DFA 130 are stored in a data store 310, which tracks one or more currently active states in one or more paths of the DFA 130. For example, considering DFA 130, each time a character from character class [abcd] is received, another parallel path through the state machine is created. Accordingly, multiple parallel paths of the state machine may have concurrently active states.

As illustrated in FIG. 3, the state transition conditions and actions comprise two entries for state S0, a single entry for state S1, and a single entry for state S2. In this embodiment, first and second slots 312, 314 of the data store 310 comprise transition and action information regarding respective transitions from state S0. More particularly, slot 312 comprises information regarding transition from state S0 to state S1 when a character from the character class [abef] is received while the state machine is state S0. The slot 314 comprises information regarding a spin transition from state S0 to state S0 when a character from the character class [abcd] is received while the state machine is in state S0. In this embodiment, because the character classes associated with transition from states S0 to either states S1 or S0 overlap, certain input characters, e.g., [ab], create parallel evaluation paths for the NFA 130.

Table 320 of FIG. 3 represents processing cycles of an NFA evaluation engine that uses the state transition conditions and actions in data store 310 in order to track active states of the NFA in evaluating an incoming data stream. In the exemplary embodiment of table 320, the input string comprises the characters "aech", which are also discussed in FIG. 2 with respect to evaluation by the NFA 120 and the DFA 130. As illustrated in table 320, at cycle 0, such as before a first character of an input stream is evaluated, S0 is marked as an active state. In one embodiment, a start state of an NFA, such as S0 of the NFA 120, is initially marked as active before evaluating characters of an input stream. In other embodiments, the initial characters of and input stream are evaluated using alternative methods, such as comparing hashed values of one or more characters of the input stream to hashed values of one or more initial characters of expressions, so that the initially active states in the data store 310 are not necessarily the start states of the NFA. In one embodiment, the cycles of table 320 correspond with single clock cycles, while in other embodiments the cycles correspond with multiple clock cycles.

With state S0 marked as active at cycle 0, the evaluation engine is ready to receive a character of the data stream. Thus, at cycle 1, the character "a" is received. As noted above, the character "a" is one character that causes multiple parallel paths of the NFA 122 to be concurrently processed. In particular, from state 0, the character "a" causes the state machine to transition to both states S1 and S0. In the embodiment of FIG. 3, the active states are updated at each cycle to show as active those states that are next states to any of the currently active states. Thus, in cycle 1, the active states comprise any states that are next states of the previous cycle (e.g., next states of S0, which is the only active state at cycle zero). Because the input character "a" causes transition to both states S1 and S0 from state S0, in cycle one, states S1 and S0 are both indicated as active.

Moving to cycle 2, the received input character "e" is evaluated in order to determine whether the input character matches transition conditions for any active states of the previous cycle. More particularly, at cycle 2, any transition conditions of states S1 or S0 that are matched by the character "e" will result in an update to the active states column. In this embodiment, the transition conditions for both states S0 and S1 match the character "e" and, thus, next states associated with both states S0 and S1 (namely, states S1 and S2) are included in the active states in cycle 2. The same process continues through cycles 3-4 until state S3 is activated in cycle 4 and the token associated with state S3 is output from the evaluation engine. In this manner, multiple paths of the NFA 130 may be concurrently processed by tracking active states of the NFA and concurrently evaluating transition conditions for all active states when each input character is received.

Figure 4:
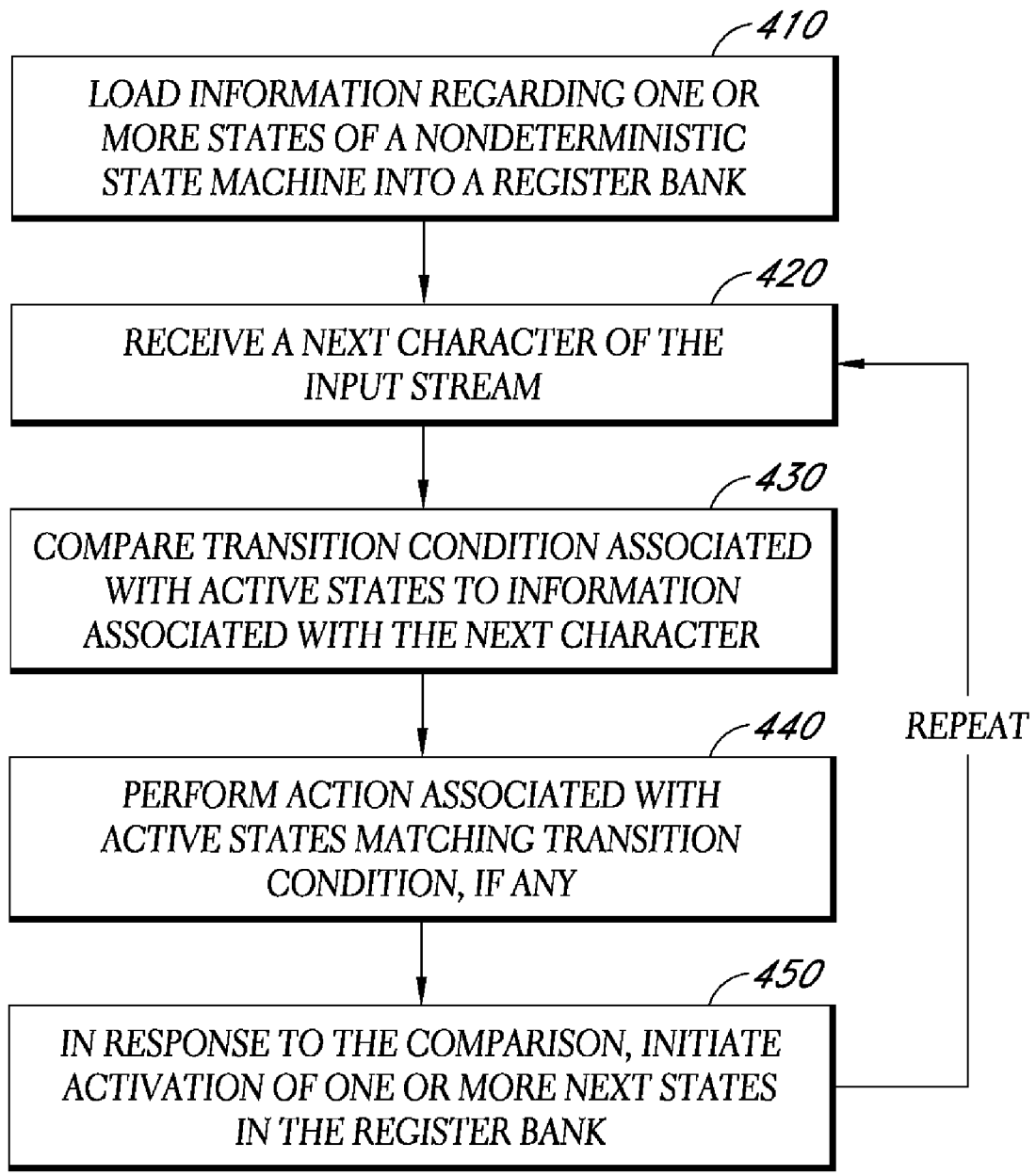
FIG. 4 is a flow chart illustrating one embodiment of a method for evaluating a NFA using hardware.

FIG. 4 is a flow chart illustrating one embodiment of a method for evaluating a NFA using hardware, such as a scanner comprising one or more register banks that are configured to store information regarding one or more active states of an NFA. Advantageously, by using hardware to evaluate NFAs in the manner described below, regular expressions comprising state explosion expressions may be evaluated without the need for exponentially large memories that are typically necessary to store state information for such NFAs.

Beginning in block 410, information regarding one or more states of a nondeterministic state machine is loaded into a register bank. In one embodiment, the register bank comprises a predetermined number of slots, where each slot comprise one or more registers, for example, and is configured to store information regarding a state of the NFA. For example, in one embodiment a register bank comprises 32 slots that each slot may comprise information regarding a state of the NFA. In certain embodiments, a single slot of the register bank may include information regarding multiple states, and in other embodiments a single state may require multiple slots of the register bank. For example, in one embodiment a single slot of the register bank may comprise information regarding multiple similar states arising from a spin or repetition operator. In one embodiment, the state information stored in the register bank comprises state transition information, such as an input character or character class that indicates a transition to another state, a token or other action associated with the state, and/or information regarding a state explosion expression. In other embodiments, less or additional information regarding the states may be stored in the register bank. For example, in one embodiment, each of the slots of the register bank also comprises a status portion that comprises information regarding whether a state associated with a particular slot is currently active, among other information that may possibly be stored in the status portion. Discussion of additional data that may be stored in the status portion of the slots is described below with respect to FIGS. 7-8, for example.

Continuing to block 420, a character of the input stream is received. For example, an input stream may comprise a stream of packets received at an end-user computing device, such as a workstation or a notebook computer, or at a network node, such as a server, switch or router.

Moving to block 430, transition conditions associated with active states in the register bank are compared to information associated with the received character. As noted above, transition information associated with active states of the state machine is stored in one or more slots of the register bank. Accordingly, at block 430, information associated with the next character may be compared to the transition information stored in the register bank in order to determine if the received character results in a match to the transition condition information in any of the active slots. Advantageously, the register bank is configured so that each of the active slots substantially concurrently perform the comparison of block 430, comparing the transition condition information with information associated with the received character. In one embodiment, for example, this comparison is performed by all active states of the register within a single clock cycle.

Continuing to block 440, any actions associated with active states in the register bank are performed. For example, if an active state comprises a transition condition for a certain character class that results in output of a token, if the character received in block 420 is a member of the character class, the indicated token is output in block 440. In other embodiments, other actions are initiated in response to matches of transition conditions associated with active states.

In block 450, activation of states having information stored in the slots of the register bank is updated such that the only active states in the register bank are those that are indicated as next states in the currently active states. Accordingly, the currently active states may become inactive while one or more next states become activated. For certain states, such as states that have state explosion transitions, the states may remain active in block 450, and additional states may also become active. In one embodiment, a next state that needs to be activated in block 450 already resides in the register bank and, thus, activation of such a state may be performed by marking the already-loaded state as active in the register bank. Other next states, however, may not be loaded in the register bank. For these states, activation may require loading of the state in the register bank, establishing one or more crossbar connections to other states in the register bank, and marking the newly-loaded state as active in the register bank. After block 450 is executed, the register bank comprises information regarding any active states in the NFA, including the transition conditions associated with those states and any tokens and/or actions associated with the transition conditions. By returning and repeating blocks 420, 430 and 440, the method of FIG. 4 traverses a NFA by maintaining information regarding active states in the register bank.

In one embodiment, state information comprising transition information, action/token information, and any other information associated with states, for all states of an NFA is stored in an inexpensive state machine memory, such as a DRAM, for example. When a state is determined to be a next state of a currently active state based on a received input character, the state information is loaded from the state machine memory into one or more slots of the register and those slots are marked as active. Alternatively, if the state information for a next state is already loaded in the register bank, the slots storing the next state information may be marked as active.

Figure 5:
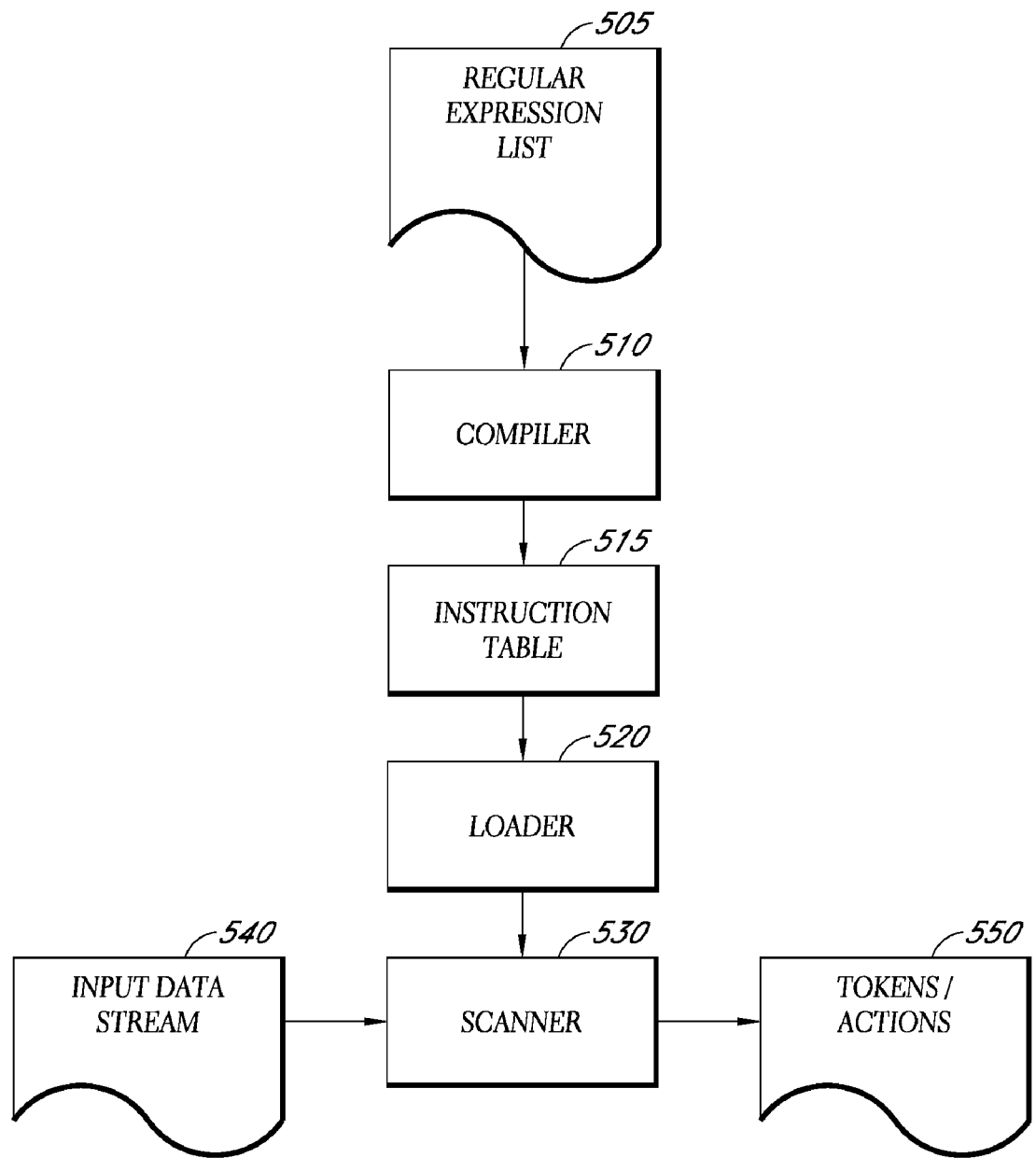
FIG. 5 is a block diagram illustrating exemplary hardware and/or software components for evaluating a NFA based on a received input data stream.

FIG. 5 is a block diagram illustrating exemplary hardware and/or software components for evaluating a NFA based on a received input data stream. In the embodiment of FIG. 5, a compiler 510 receives a regular expression list 505 comprising one or more regular expressions. In this embodiment, the compiler 510 is configured to compile the regular expressions into one or more NFAs having states that each comprise corresponding state information, such as transition condition information and/or tokens/actions associated with respective states. In the embodiment of FIG. 5, the compiler 510 is in communication with an instruction table 515 that stores state information for the NFA generated by the compiler 510. A loader 520 is also in communication with the instruction table 515 and is configured to selectively load information regarding states of the state machine into a NFA scanner 530. In one embodiment, the loader 520 loads new states into one or more register banks of the scanner 530 and configures a crossbar that connects certain states that are loaded in the register bank (see FIGS. 11-12 for detailed description of crossbars). In one embodiment, state information for all states of a generated NFA is stored in the instruction table 515, available for use by the scanner 530, while state information for only a small fraction of the states of the NFA is concurrently, or alternatively, stored in the scanner 530. For example, in certain embodiments the instruction table 515 may comprise state information for NFAs comprising hundreds of thousands of states, but the scanner 530 may store state information regarding only a small portion of those states, such as 16, 32, 64, 96, 128, 160, 256, 512, or 1024 states, for example.

Depending on the embodiment, certain components illustrated in FIG. 5 may be embodied in one or more reconfigurable logic devices, such as a field programmable gate array (FPGA), an application specific integrated circuit (ASIC), or a multi-chip module. For example, the loader 520 and scanner 530 may be implemented in hardware in any such device. In one embodiment, the scanner 530 and/or other components illustrated in FIG. 5 comprise components of a network interface card (NIC) that are configured for communication with a network server. In another embodiment, the scanner 530 may comprise a logic design that is used by one or more third parties in products designed, manufactured, and/or sold by the third party. For example, the scanner 530 may comprise a logic design that is included in an FPGA, ASIC, and/or system-on-chip (SOC) that is implemented by a third party, along with other logic of the third party. In other embodiments, components of the scanner 530 may be implemented on a personal computer or a dedicated processing unit for monitoring web traffic.

In one embodiment, the scanner 530 comprises one or more NFA engines, where each NFA engine comprises one or more register banks (described in further detail below). In the embodiment of FIG. 5, an input data stream 540 comprising a plurality of characters is received by the scanner 530 that has been pre-loaded by the loader 520, for example, with state information for one or more states of an NFA. In one embodiment, the loader 520 comprises multiple loaders, such as a loader for each of the register banks in the scanner 530. In one embodiment, based on the active states of the scanner 530 and the input characters of the data stream 540, the states having state information stored in slots of one or more register banks of the scanner 530 are updated after each character is received, so that the register banks track currently active states along one or multiple parallel evaluation paths of the NFA. When a state of the NFA is reached that is associated with a token and/or other action, the scanner 530 outputs the appropriate token/action 550.

Figure 6A:
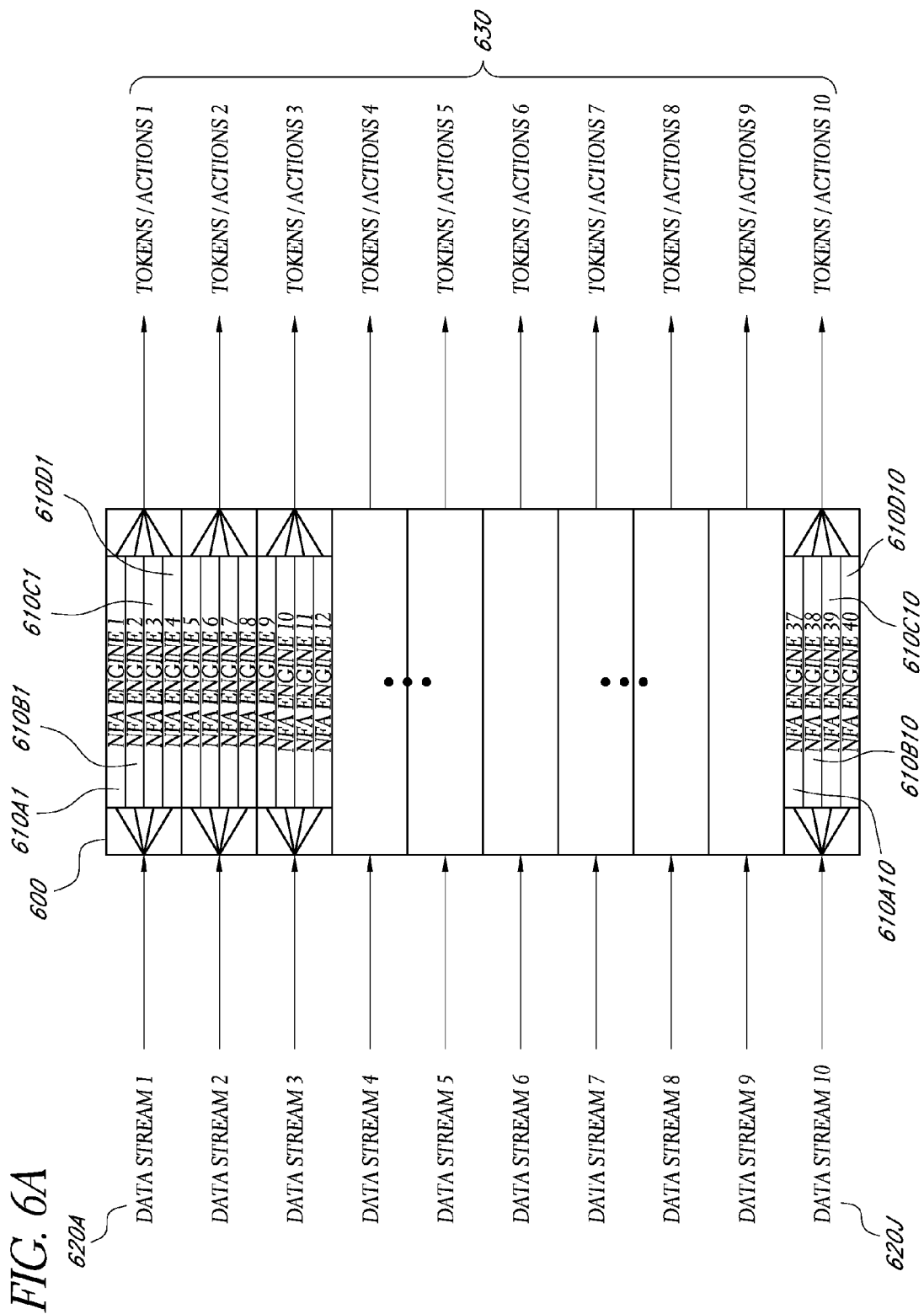
FIG. 6A is a block diagram illustrating one embodiment of a scanner for maintaining information regarding active states of an NFA, and other information related to the NFA.

FIG. 6A is a block diagram illustrating one embodiment of a scanner 600 for maintaining information regarding active states of an NFA, and other information related to the NFA. The scanner 600 may be embodied in one or more reconfigurable logic devices, such as a field programmable gate array (FPGA), an application specific integrated circuit (ASIC), or a multi-chip module. In the embodiment of FIG. 6A, the scanner 600 comprises 40 NFA engines 610 that are configured to process 10 concurrently received data streams 620. In one embodiment, each NFA engine 610 comprises a register bank with a plurality of register slots, as well as additional circuitry for loading, transmitting, and receiving information from the register banks. In other embodiments, a NFA engine 610 may comprise multiple register banks each having a plurality of register slots.

Figure 10:
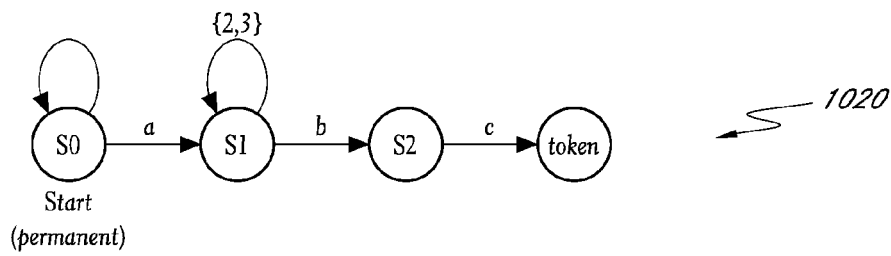

In the embodiment of FIG. 6A, 10 output streams 630 comprising tokens and/or actions are transmitted from the scanner 600, such as in response to activation of a state associated with an action or token. In the embodiment of FIG. 6A, a first data stream 620A is received by four NFA engines 610A1, 610B1, 610C1, and 610D1 that operate in parallel in order to provide additional register slots for storing state information, such as transition condition information and actions/tokens associated with states. Likewise, the 10th data stream 620J is received by four NFA engines 610A10, 610B10, 610C10, and 610D10 that operate in parallel to process the data stream 620J. In other embodiments, the NFA engines 610 may be grouped in other manners in order to more appropriately process incoming data streams. For example, if 40 NFA engines 610 are available for processing data streams, but only four data streams are typically received by the scanner 600, the scanner 600 may be reconfigured such that each data stream is received by 10 of the 40 NFA engines 610 in order to provide potentially faster processing of the four received data streams.

Figure 6B:
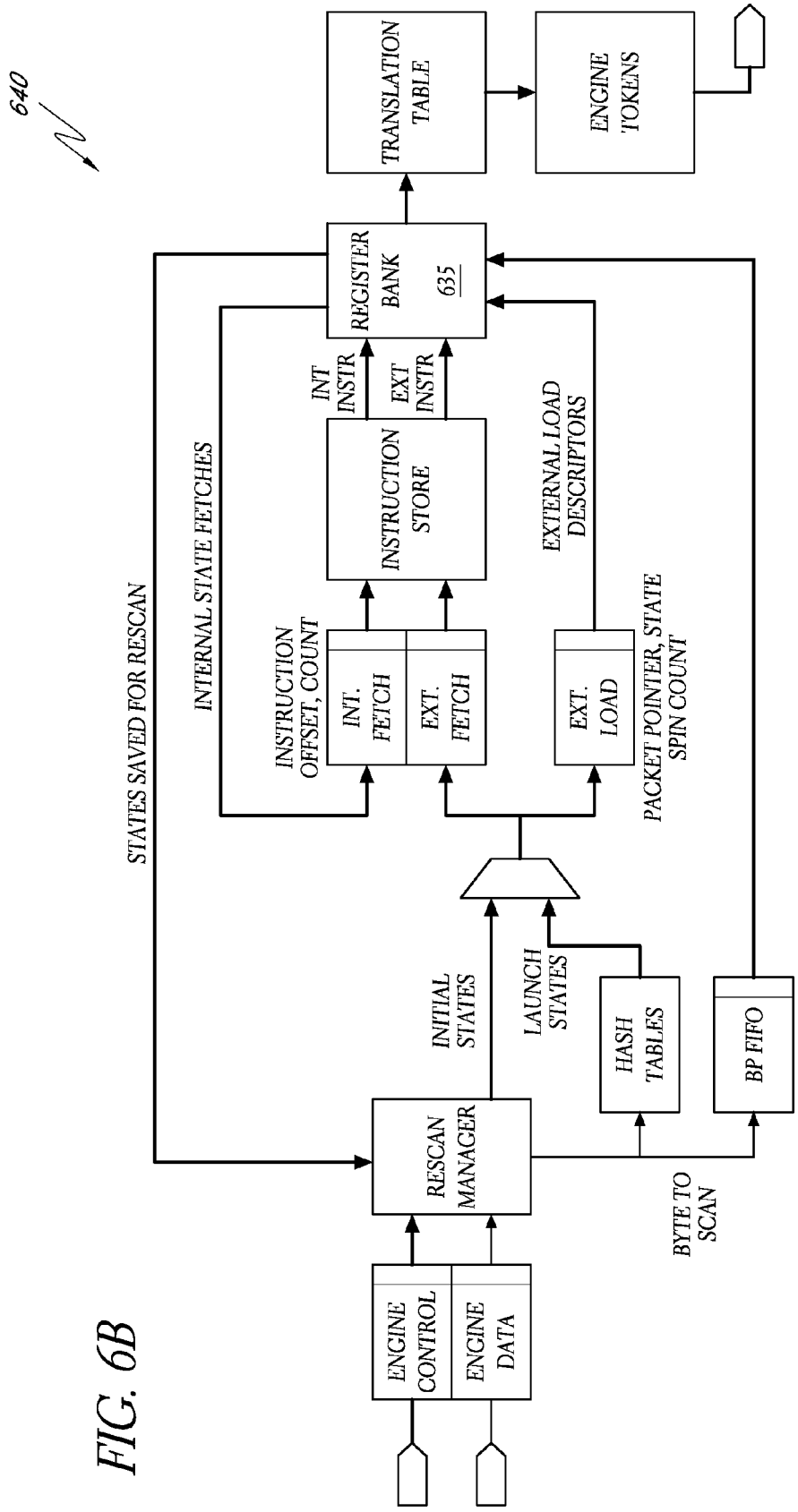
FIG. 6B is a block diagram illustrating one embodiment of a NFA engine 640, such as the NFA engines 610 of FIG. 6A.

FIG. 6B is a block diagram illustrating one embodiment of a NFA engine 640, such as the NFA engines 610 of FIG. 6A. As illustrated in exemplary FIG. 6B, the NFA scanner 640 comprises a register bank 635, as well as additional circuitry that loads the proper state information into the register bank, updates state information in the register bank 635, and outputs any tokens or other outputs from the register bank 635.

Figure 6C:
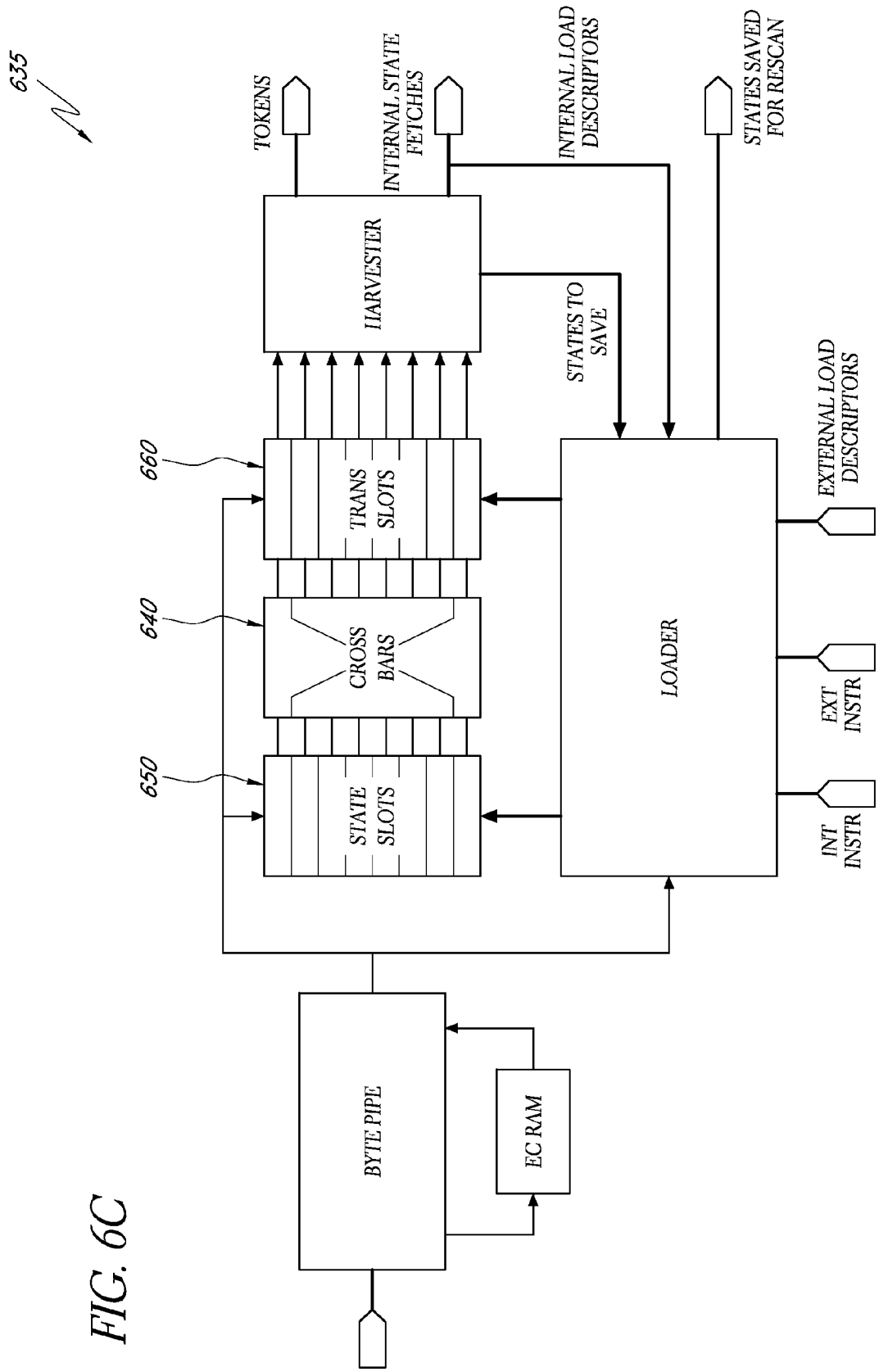
FIG. 6C is a block diagram illustrating one embodiment of the register bank, including a crossbar that is selectively coupled to state slots and transition slots.

FIG. 6C is a block diagram illustrating one embodiment of the register bank 635, including a crossbar 640 that is selectively coupled to state slots 650 and transition slots 660. In one embodiment, the states slots hold information regarding whether respective states are active, and if a state is active, what is the current spin count for the state. Advantageously, spin counts and active indicators are dynamic information that is updated with evaluation of each character of an input stream. The state slots 650 may also include static information, such as spin minimum, spin maximum, instruction offset (location of instruction in instruction memory), etc., for respective states. In one embodiment, the transitions slots comprise comparison logic that looks at that transition condition and spin condition in order to determine which state slots should be loaded, activate, deactivated, have updated spin counts, etc. In one embodiment, if the spin condition in state slots matches the desired range, a connection is made to the respective transitions slots via the crossbar, so that the spin signal gets to the appropriate transitions slots, or multiple transitions slots associate with the state. The crossbar may comprise reconfigurable logic, such as one or more FPGAs, so that connections between the state slots 650 and transition slots 660 may be dynamically updated as the corresponding state machine is traversed. FIGS. 11-12 illustrate exemplary operations of a crossbar.

In other embodiments, the NFA engine and/or register bank may comprise fewer or additional components than are illustrated in FIGS. 6B and 6C. Additionally, depending on the embodiment, an NFA engine and/or register bank may comprise entirely different components than are illustrated in FIGS. 6B and 6C.

Figure 7:
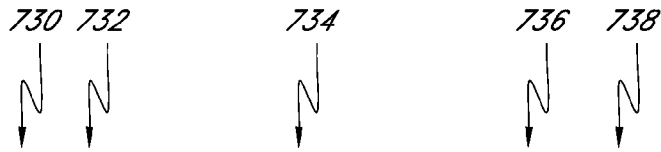
FIG. 7 illustrates a NFA portion and associated state information stored in a register bank of an NFA engine, such as one of the NFA engines of FIG. 6A.
Figure 7:
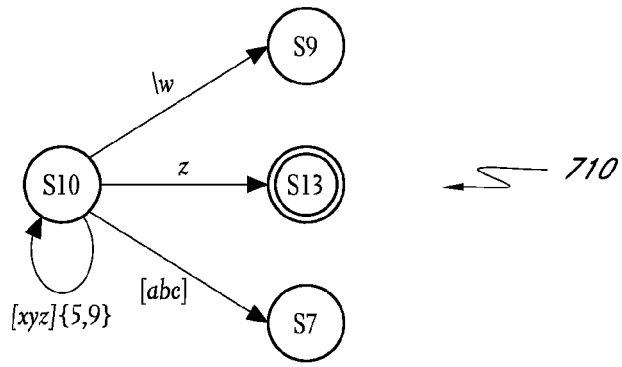

FIG. 7 illustrates a NFA portion 710 and associated state information stored in a register bank 700 of an NFA engine, such as one of the NFA engines 610 of FIG. 6A. As shown in FIG. 7, the NFA 710 comprises a state S10 that includes three transitions to other states S9, S13, and S7, and a spin condition that results in a transition from state S10 to state S10. In the embodiment of FIG. 7, the NFA 710 illustrates a spin state S10 associated with a spin expression [xyz]{5,9}. In the NFAs of FIGS. 7-10, spin expressions are associated with different characteristics than in standard NFAs. In particular, the spin expressions, such as in spinning state S10 in FIG. 7, must be matched before any of the other transitions out of the spinning state may be performed. For example, if a first character received by a NFA engine evaluating the NFA 710 is "c", the NFA engine terminates, even though "c" matches the transition condition for moving to state S7, because the spin expression of the state is not then matched. If, however, the NFA engine received from 5-9 characters in the character class [xyz] followed by the character "c", the NFA engine would transition from the spin state S10 to state S7. By associating NFA spin states (in FIGS. 7-10) with a requirement that the associated spin expression must be matched prior to transition out of the spin state, the spin expressions may be drawn more compactly and the NFA may be more easily mapped into memory spaces of register banks for parallel processing of NFA paths. In other embodiments, NFA spin states may be illustrated in the standard NFA format, or in any other configuration, such as by including multiple states for a single spin state.

Due to the spin expression associated with state S10, a parallel NFA processor may have multiple paths of the NFA that are concurrently traversed. In the exemplary arrangement of FIG. 7, for each slot of the NFA, the register bank 700 stores a slot identifier 730, a state identifier 732, transition condition information 734, state information 736, and status information 738. In the embodiment of FIG. 7, the register bank 700 comprises N slots, where N is any suitable number of slots, such as 4, 8, 16, 32, 64, 128, 256, 512, or 1024, for example.

Exemplary register bank 700 stores information regarding multiple states of a NFA. As illustrated in FIG. 7, register bank 700 comprises information associated with a current state S10. More particularly, in slots 3, 4, and 5 of the register bank 700, information regarding state S10 is stored and the status indicators for those slots indicate that the slots are active (indicated by the "A" in the status column 738). In this example, each of the slots 3, 4, and 5, include information regarding different transitions out of state S10. In particular, slot 3 comprises transition information 734 regarding a transition to state S9, slot 4 includes transition information 734 regarding transition to state S13, and slot 5 comprises transition information 734 regarding transition to state S7. In this embodiment, state S13 is a terminal state that is associated with outputting a token. Thus, the transition information in the slot corresponding to state S13 indicates an associated token output. Slot 3 of the register bank also comprises state information 736 indicating a spin range that is necessary prior to performing any other transitions out of state S10. In this example, the spin range associated with slot 3 indicates that from five to nine characters from the character class [xyz] must be received, followed by a character from the class [abc] in order to transition to state S7, for example. In this embodiment, the spin range (e.g., {5,9}) is stored as state information 736 associated with each of the three slots S10a, S10b, and S10c. Thus, each of the slots 3, 4, and 5 indicates how many spins are necessary prior to enabling transition out of the current state. In one embodiment, the status field 738 comprises spin count information indicating a number of spins that have already occurred for a current spin state. Thus, for a transition condition (e.g., in column 734) that has an associated spin range (e.g., in column 736), the spin count in the status field 738 may be compared to the spin range in order to determine if the transition condition, if matched by a current input character, is enabled to initiate the indicated transition.

Figure 8A:
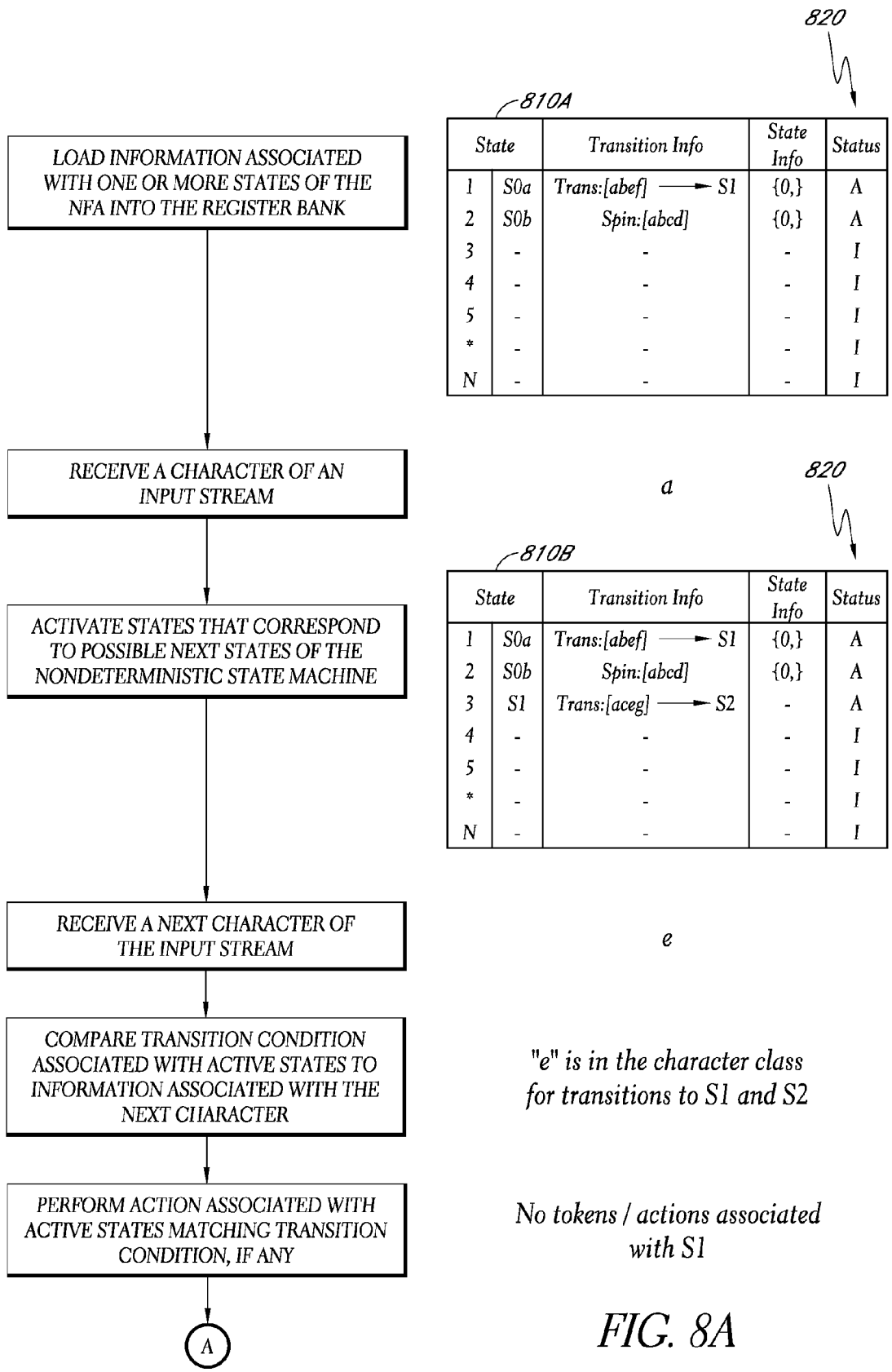

FIGS. 8A and 8B are flowcharts illustrating an exemplary process that is performed by hardware components in evaluating an exemplary input data stream against an NFA, where state information for selected states of the NFA is stored in a register bank. In the example of FIGS. 8A and 8B, state information corresponding to the NFA 120 (FIG. 1) is updated in the register bank 810 as characters of an exemplary input stream "aech" are received. Thus, the method of FIG. 8 illustrates how the hardware components, e.g., a bank of registers, may be updated in order to process parallel paths of a NFA, including NFAs comprising spinning states.

As shown in FIG. 8A, the register bank 810A comprises information regarding a start state S0 in slots one and two of the register bank 810A. In the status column 820, state S0 is indicated as active by the "A", while the remaining slots 3-N are indicated as inactive by the "|" in the status column 820. In one embodiment, the status column 820 comprises a one bit flag that includes a zero if the corresponding slot is active and a one if the corresponding slot is inactive, or vice versa, for example. In other embodiments, the status column 820 comprises multiple bits and/or bytes of data associated with the transition indicated in the corresponding slot. In certain embodiments, the status column 820 comprises a spin count, indicating a number of spins that the associated spinning state has already undergone. For example, for the spin expression [abc]{30,40}, the status column 820 may comprise a spin count indicating the number of consecutive characters matching the character class [abc] that have already been scanned in a received input stream. In this embodiment, the status column 820 may be read in order to determine when the spin expression is satisfied, such as when characters from the character class [abc] have been received between 30 and 40 times for the spin expression [abc]{30,40}.

As shown in FIG. 8A, when a first character "a" is received by the register bank 810A, the register bank is updated to indicate one or more states of the NFA that may be concurrently active in response to receiving the character. As illustrated in FIG. 8A, after receiving "a", the register bank 810B is loaded with transition information, state information, and status information for state S1, and slots for states S0 and S1 are marked as active in the status column 820. This corresponds with the parallel paths that are pursued by the NFA 120 (FIG. 1) from state S0 when the character "a" is received. More particularly, when an "a" is received in state S0, the NFA can go to either states S1 or return to state S0. In a software NFA engine, the paths may be traversed sequentially, such as by pursuing the transition to state S1 in a first scan of the input characters and then pursuing the transition to state S0 upon receiving this first "a" in a subsequent scan of the input characters. However, as those of skill in the art will recognize, such a sequential scan of multiple paths of an NFA can quickly cause state explosion and may result in thousand, millions, or more, sequential scans of a character string in order to pursue all possible paths of the NFA. However, in the embodiment of FIG. 8A, multiple paths of the NFA are traversed in parallel by storing the state information associated with any active states in the register bank 810 and indicating which of the stored states are active at any point in time.

In the exemplary embodiment of FIG. 8A, the character "e" is received after the character "a". Upon receiving the character "e", the character is compared to transition conditions of any active states, e.g., states S0 and S1 in register bank 810B, to determine which next states should be made active prior to receiving a subsequent character. In this particular example, because the character "e>" matches the character class [aceg] in the transition information of slot 3, the NFA engine determines that the indicated transition in slot 3 should be traversed. Accordingly, as shown in register bank 810C, state information for state S2 has been loaded into slot 4 of the state machine and that slot has been marked as active. Additionally, because the character "e" matches the character class [abef] in slot 1 (which is active when the character "e" is received), the transition indicated in slot 1 is also traversed, resulting in continued activation of state 1 in slot 3 of the register bank 810C. However, because state S0 is not an indicated next state in any matched transition conditions, slots 1 and 2, which are associated with state S0, are marked as inactive in the status column 820.

The register bank then receives the next character in the input stream, which is a "c" in the example of FIG. 8. There are no tokens associated with matches of "c" to any transition condition in active slots, e.g., slots 3 and 4 in register bank 810C, and the method continues to determine which next states should be activated in response to receiving the character "c". As illustrated in register bank 810C, the character "c" matches only one transition condition in an active slot, namely, the transition condition in slot 3 (state S1). Thus, the register bank 810D has been updated to indicate that state S2 (slot 4) remains active, while the remaining slots become inactive.

When the next character in the input stream, "h", is received, the NFA engine matches the "h" with the transition condition of active state S2 and outputs the indicated token.

Figure 9:
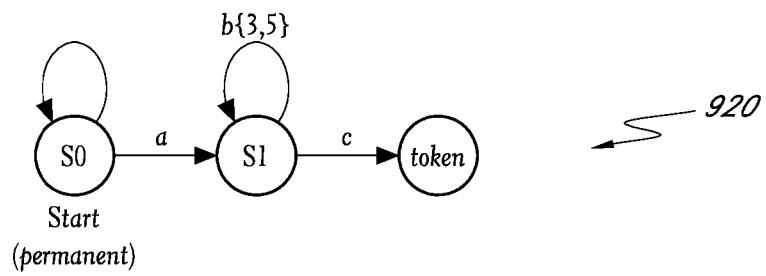
FIGS. 9 and 10 illustrate exemplary methods of storing state status information, such as in register banks of FIG. 6A, in a binary (FIG. 9) and vector (FIG. 10) formats.

FIGS. 9 and 10 illustrate exemplary methods of storing state status information, such as in register banks 610 of FIG. 6A, in a binary (FIG. 9) and vector (FIG. 10) formats. As discussed above, e.g., with reference to FIG. 7, in certain embodiments slots of a register bank store status information, such as information regarding whether a state is active or inactive. Additionally, the status information may advantageously comprise a spin count indicating a number of times that a spin transition has occurred. As noted above, certain spin expressions require a certain range of spins before advancing to a next state in a NFA. Accordingly, the number of spins may be tracked by recording the number of spins (a "spin count") associated with a spin state in the register bank. In the embodiment of FIG. 9, the spin count is recorded in a binary counter and in FIG. 10, the spin count is record in a vector counter. As noted below, the binary or vector spin counters may be selected based on characteristics of the spin expression and/or transitions into the spin rate.

In FIG. 9, the regular expression 910 is converted to a NFA 920. In the NFA 920, the spin state S1 is associated with a transition condition that must occur prior to transitioning out of state S1. With reference to FIG. 9, the character "b" must be received from 3 to 5 times before transition out of state S1 is possible. When the spin count for receiving the character "b" is in the range of 3-5 and the character "c" is received, the transition to the token is taken and an appropriate token is output. In this embodiment, the spin expression "b{3,5}" qualifies for binary storage of the spin count because the spin expression is 'guarded.' A guarded spin expression is one that will not have multiple parallel spin counts. Whether or not a spin state is guarded or unguarded is at least partly dependent on the transition conditions for states immediately prior to the spin expression. For example, in FIG. 9, since an 'a' is required to activate S1, and an 'a' will fail to spin S1, there is no possibility of multiple spin counts for state S1 being concurrently valid. However, if 'a' was included in the character class of the spin expression associated with state S1 (e.g., [ab]{3,5}), state S1 may have multiple parallel spin counts as multiple 'a' characters may result in concurrent activation of state S1.

In the embodiment of FIG. 9, the start state S0 comprises a permanent spin state (a spin state that spins on any input character and does not have a repetition operator), or a permanently active state. In one embodiment, an indicator is placed in the state information field of a state slot, e.g., slots 720 of FIG. 7, to indicate that the state is a permanent spin state and that a spin count does not need to be recorded. In one embodiment, the characters "PERM" or "P" or any indicator thereof, may be included in the state information for a permanent spin state. In other embodiments, other suitable indicators may be used to indicate a permanent spin state.

Table 930 of FIG. 9 illustrates the content of the transition information and/or state status fields of register slots of a register bank. In one embodiment, the spin count is stored in the status information field (e.g., 738) of the register slots, while in other embodiments, the state information field (e.g., 736) stores the spin count. In the table 930, the content of a first slot 932 and a second slot 934 are illustrated as the character string "abbcabbbbc" is received by a scanner configured to match strings against the NFA 920. In FIG. 9, a character count is illustrated to the left of an input character column 936 for purposes of clarity in referring to specific characters in the input character string.

In table 930, slot 934 stores the binary count of the spin state S1, which is accessed in order to determine if transition from state S1 is permitted. As shown in table 930, when the character "a" (character 1) is received in state S0, the transition condition associated with state S0 (e.g., "a") is matched and states S1 is marked for activation prior to evaluating the next character. Thus, when the character "b" (character 2) is subsequently received, both state S0 (slot 932) and states S1 (slot 934) are active. At this stage, the spin count is still zero, indicated by the "[0]" in row 2 of the table 930. Thus, in the embodiment of FIG. 9, the spin counts illustrated in slot 934 indicate a spin count prior to receiving the character indicated on the same row, and the spin and token actions indicate actions to be performed in response to receiving the input character on the same row. In this embodiment, if the spin action is indicated after receiving a character, e.g., after receiving characters 2, 3, 6, 7, 8, and 9, the spin count in slot 934 is incremented prior to receiving the next character, as illustrated in states 3, 4, 7, 8, 9, and 10.

In the specific example of FIG. 9, because the "b" (character 2) matches the spin expression, slot 2 is updated to indicate that a spin condition has been met and that the spin count is to be incremented. In row 3 of table 930, the spin count has been incremented to "[1]".

As shown in FIG. 9, state S1 rejects the first 'c' (character 4) as matching a transition condition to the Token because the spin count in slot 934 is 2 when the 'c' is received, which is below the spin range {3,5} required by the spin expression. The 'c' (character 4) also fails the spin condition, and S1 goes inactive (as shown in row 5 of table 930 where there is no spin count).

As shown in FIG. 9, state S1 accepts the second 'c' (character 10) as matching a transition condition to the Token because the spin count in slot 934 is 4 when the 'c' is received, which is within the spin range {3,5} required by the spin expression. As a result, the NFA engine outputs the indicated token.

In FIG. 10, the regular expression 1010 is converted to a NFA 1020. In the NFA 1020, the spin state S1 is associated with a transition condition that must occur prior to transitioning out of state S1. In this embodiment, the period, in the regular expression 1010 indicates a match to any character. In other embodiments, the period may indicate a match to any character except a newline character. As those of skill in the art will recognize, the regular expression 1010 matches an "a" separated by two or three characters from the two-character sequence "bc". In the embodiment of FIG. 10, the spin expression associated with state S1 is 'unguarded' because there may be multiple active parallel spin counts associated with state S1. More particularly, with reference to exemplary NFA 1020, any 'a' will activate, or reactive, state S1 with a count of zero, but if at the time S1 already has an active count between 0 and 2 as a result of previously received "a" characters, it will then have at least two active counts. Thus, for an unguarded spin state, a single binary spin count is not sufficient to count the spin for each of multiple spin states. Accordingly, in one embodiment, a separate binary spin count may be kept for each parallel spin of a spin state. However, certain regular expressions, such as an unguarded spin expressions with a large spin range, may have hundred, thousands, or more parallel binary spin counts associated with a spin state.

In one embodiment, the spin count for multiple parallel paths through a spin state are recorded in a vector counter, rather than a binary counter. In one embodiment, a vector counter comprises a vector having a quantity of bits equal to a maximum range value plus one, such that each of the vector bits indicates whether a particular spin count is currently active for the spin state. For example, if the spin range is {1,10}, an 11 bit vector may be used to indicate whether a spin counts of 0, 1, 2, 3, 4, 5, 6, 7, 8, 9, and/or 10 have been reached for the associated spin state. In this way, only 11 bits may be used to track up to 10 parallel active paths through the spin state.

In the specific example of FIG. 10, the table 1030 illustrates the content of three slots of a register bank as the input character string "aabcabcbcb" is received by a scanner configured to match the NFA 1020. As those of skill in the art will recognize, the input string "aabcabcbcb" comprises two strings that match the regular expression 1010, namely "abcabc" (characters 2-6 of the string) and "abcbc" (characters 5-9 of the string).

As shown in FIG. 10, the unguarded spin expression of state S1 has a spin range of {2,3} and, thus, a vector comprising four bits is illustrated as stored in slot 1034, which is associated with state S1. As shown in table 1030, when the first 'a' (character 1) is received, state S1 is marked for activation, but there is not yet a spin count associated with the state. However, slot 1034 is updated in line 2 prior to receiving a next character to include a vector spin counter indicating only a count of zero, e.g., the first bit of the vector [1000] represents a spin count of zero and none of the other bits are active. When the second 'a' (character 2) is received, any active vector count bits are shifted to show that another spin has occurred and a new bit indicating a new spin count should be activated. Thus, in row 3 of table 1030, the vector counter in slot 1034 ("[1100]") indicates that a spin count of 1 has been reached, but that spin counts of 2 and 3 have not been reached. In addition to incrementing the spin count of a first path through the NFA, the second 'a' (character 2) also initiates a new parallel path through the NFA by matching the transition condition of state S0. Thus, as illustrated on line 3 of table 1030, prior to receiving the first "b" (character 3), the vector counter indicates that spin counts of 0 and 1 have each been reached by different character strings of the received input string. In this way, spin counts for parallel paths through a NFA may be economically tracked.

For the NFA 1020, the spin count at state S1 must be either 2 or 3 before transition out of state S1 is permitted. Thus, when either or both of the third and fourth bits of the spin vector in slot 1034 are active, the register bank may transition out of state S2 if the associated transition condition is matched, e.g., if the character "b" is received when the spin count is at 2 or 3. In row 6, for example, a spin count of zero and 3 are both indicated as active. Thus, when the "b" (character 6) is received, matching the transition condition of state S1, state S2 is marked for activation and is activated prior to receiving a subsequent character, as shown in row 7 of slot 1036. As illustrated in line 10 of table 1030, when a spin is indicated for a vector counter with only an active spin count of the highest possible count, e.g., only a spin count of 3 is indicated in the vector [0001] in line 9, state S1 goes inactive and the vector counter is cleared.

Table 930 of FIG. 9 and table 1030 of FIG. 10 comprise information illustrative of spin transitions and spin counts that may be stored in slots of one or more register banks. Tables 930 and 1030 are not intended to illustrate all of the information stored in slots of register banks, but are intended to illustrate certain information that aids in understanding how binary and vector counters may be established and operated to maintain spin counts. In one embodiment, the slots of FIGS. 9 and 10 comprise the same information as illustrated in FIG. 7, for example, while in other embodiments the slots of FIGS. 9 and 10 may comprise additional or less information than illustrated in FIG. 7.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

FIGS. 11A-11F are conceptual diagrams illustrating how a crossbar, such as the crossbar 640 of FIG. 6, is used in a NFA engine according to one embodiment. In general, a crossbar comprises logic devices, such as reconfigurable hardware logic devices including FPGAs and/or TTL logic gates, that create physical connections between slots of a register bank and dynamically update the physical connections as the state machine (that is at least partially stored in the register bank) is processed by the scanner. For example, a crossbar 640 may create a physical connection between a current state and one or more possible transition states. With this hardware connection in place, an activation signal may be substantially immediately transmitted to the corresponding next state (e.g., based on the particular input character) as soon as the next input character is considered. Thus, the states that are active in the register bank may be updated based on activation signals transmitted via the crossbar and, accordingly, with a new set of active states in the register bank, the crossbar is updated to include connections to the currently active states. FIGS. 11A-11F each illustrate a state column 1106 that indicates one or more states that are currently loaded into a scanner register bank and a transition state column 1108 that indicates the possible transition states from the currently active states in the state column 1106. A crossbar 1115 indicates currently active connections between states in the state column 1106 and states in the transition column 1108. An active column 1102 indicates whether states loaded into the register bank (e.g., indicated in state column 1106) are currently active and a spin column 1104 indicates spin counts for respective states. FIGS. 11A-11F indicate sequential changes to the information stored in a scanner, include crossbar connections, as the exemplary input string "aaech" is scanned by the state machine 1120. Although the embodiment shown in FIGS. 11A-11F show the active states 1106 and the transition states 1108 in different columns, the active state column and the transition state column represent different aspects of the same register bank entries. The register bank entry is split over column 1106 and column 1108 in order to illustrate the concept of the crossbar 1115, where the crossbar 1115 comprises conceptual or physical connections between slots of the register bank. Depending on the embodiment, the connections of the crossbar 1115 may be updated as states are loaded into the register bank(s) and/or after the states are loaded into the register banks.

Figure 11A:
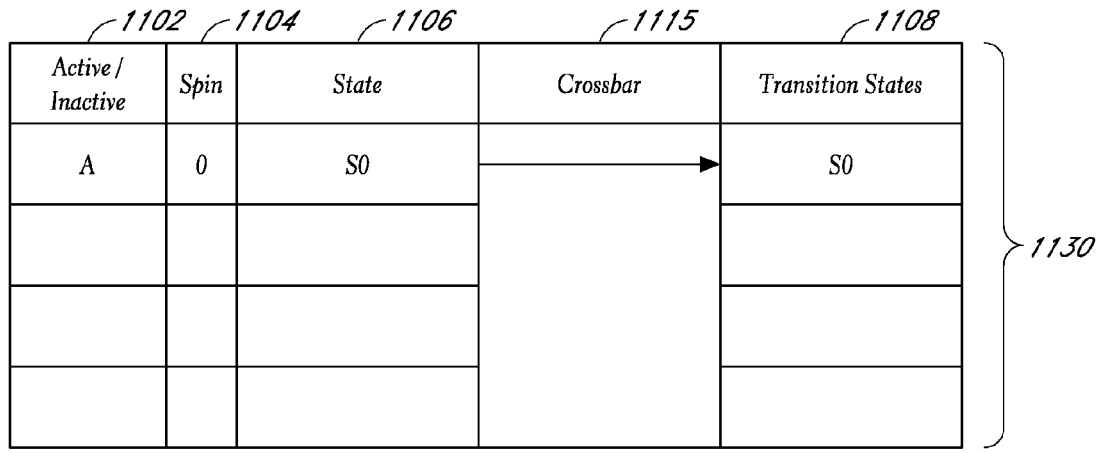
FIGS. 11A-11F are conceptual diagrams illustrating how a crossbar, such as the crossbar of FIG. 6, is used in a NFA engine according to one embodiment.
Figure 11A:
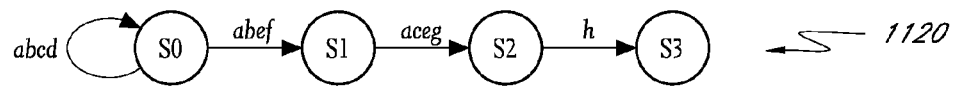

Referring to FIG. 11A, the slots 1106, 1108 and the crossbar 1115 illustrate that the starting state S0 is loaded into the register bank so that the scanner is ready to receive an input string. No characters from the input string 1110 have been processed. According to state machine 1120, S0 can spin to itself if it receives a character from the character class [abcd] or it can transition to S1 if it receives a character from the character class [abef]. In the embodiment of FIG. 11, the scanner is configured to load state information only when a transition to that particular state is requested. Thus, with reference to the transition from S0 to S1, S1 is not yet loaded in the register bank because a transition to state S1 is not yet proper. However, if a character matching the character class [abef] is received while S0 is active, the transition to state S1 will be necessary and state S1 will be loaded into the register bank with a corresponding connections in the crossbar 1115 between S0 and S1 (see FIG. 11B, for example).

In the embodiment of FIG. 11, the crossbar is updated with connections between states (including spin states) that are already loaded in the register bank before a transition to the particular next states is activated. Thus, the register bank of FIG. 11A illustrates a connection between S0 in the source state column 1106 and S0 in the transition state column (which, as noted above, represent the same slot of the register bank) prior to a spin transition from S0 to S0 because S0 is already loaded in the register bank. In one embodiment, each time a state is loaded, the loader looks for any of its destinations already present in the register bank, and any of its sources already present, and programs the crossbar at that time with those connections. In other embodiments, next states of a loaded and active state may be loaded in the register bank with the appropriate crossbar connections prior to a necessary transition to the next states. In column 1104, the spin count for S0 is indicated as 0 because no spin transitions have yet occurred.

Figure 11B:

In FIG. 11B, the character "a" is processed and the slots and crossbars are updated accordingly. As shown in the state machine 1120, receiving an "a" at S0 causes S0 to spin and causes a transition to S1. Thus, after receiving the "a", a transition to S1 is necessary and S1 is accordingly loaded in the register bank with a connection between S0 in the source state column 1106 and S1 in the transition state column 1108 and becomes active via the new connection. As noted above, in other embodiments, S1 may be loaded prior to determining that a transition to S1 is necessary (e.g., by receiving the character "a" while S0 is active).

Figure 11C:
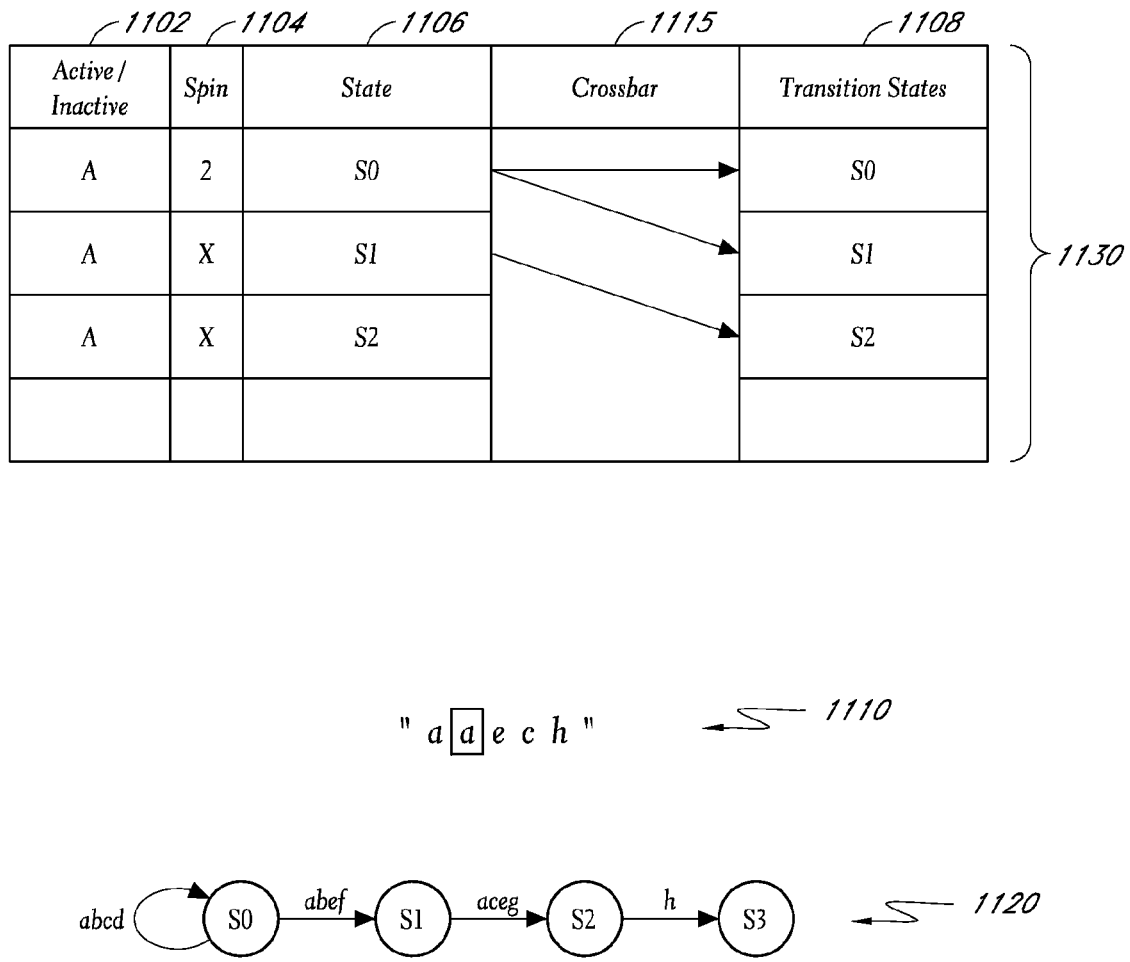

Moving to FIG. 11C, a second character "a" is processed and the slots and crossbars are updated accordingly. After receiving this second "a", S2 is loaded in the register bank and becomes an active state. The cross bar is updated to indicate a connection between S1 and S2 and state S2 becomes active via the connection ((e.g., because this second "a" satisfies the transition condition "aceg" that is associated with transition from S1 to S2). S0, S1 and S2 are now active states. The spin count for S0 is updated to 2.

Figure 11D:
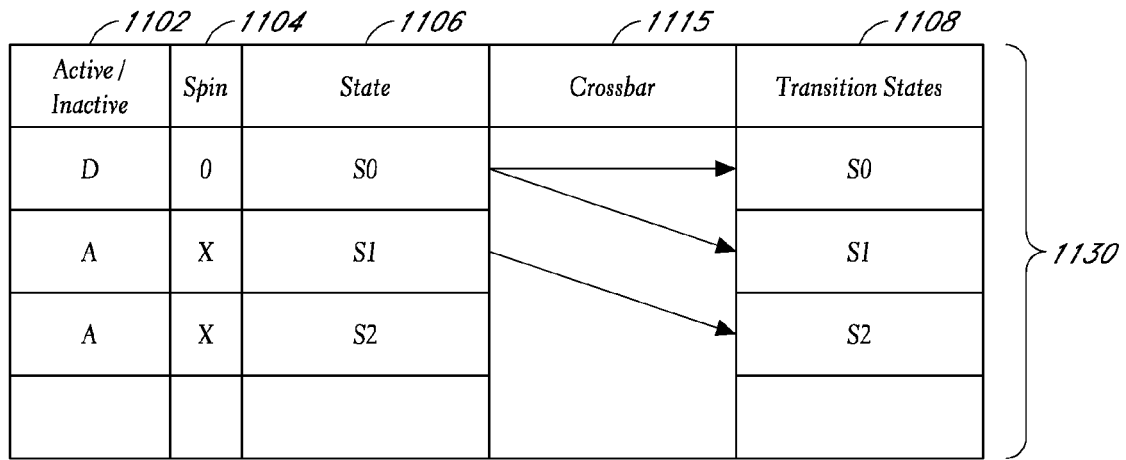
Figure 11D:
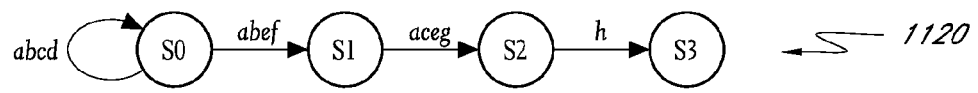

In FIG. 11D, the character "e" is processed and the slots are updated accordingly. In the embodiment of FIG. 11 the start state S0 is not marked "permanent," meaning that S0 does only stays active so long as there is a spin count associated with the state. A start state that is not marked permanent only starts a match at the beginning of a data string or buffer associated with the string. Accordingly, in FIG. 11D, after receiving the character "e", which does not satisfy the spin condition "abcd", S0 becomes an inactive state. In other embodiments, S0 may be marked "permanent" and may always remain active. In general, a permanent start state can begin to match an input string at any character position. If a permanent state is also a spin state, although the state remains active, the spin count may reset when the spin transition condition is not matched. After receiving the character "e", S1 and S2 remain active as transitions to those states from states S0 and S1 are activated. As S0 becomes inactive, the spin count may be reset to 0 or, alternatively, the spin count may be reset to 0 if S0 again is activated.

Figure 11E:
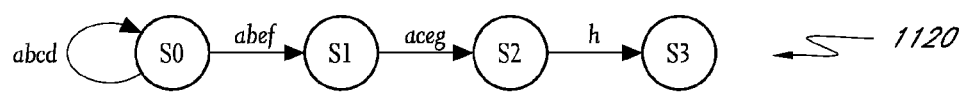

In FIG. 11E, the character "C" is processed and the slots are updated accordingly. After receiving the "c", S1 also becomes an inactive state. S2 is now the only active state.

Figure 11F:
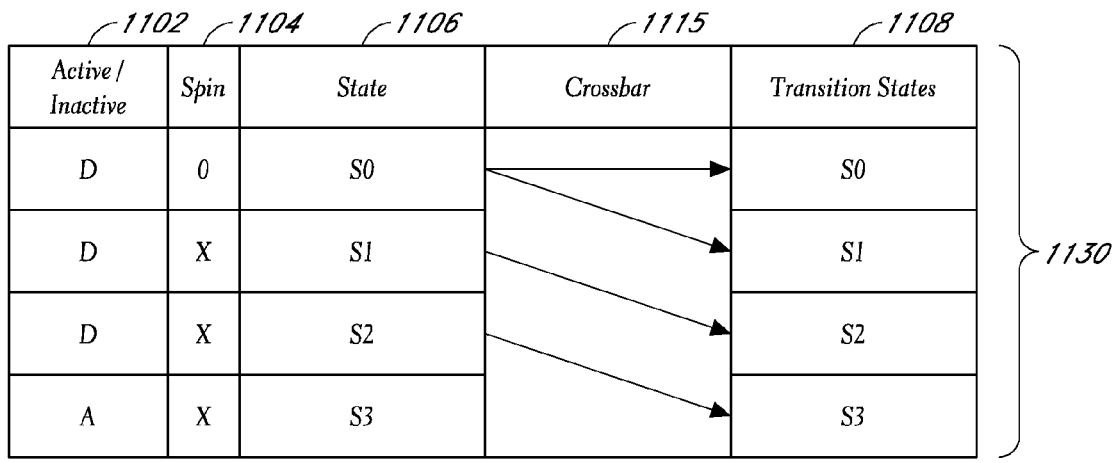

In FIG. 11F, the character "h" is processed and the slots are updated accordingly. After receiving the "h", a transition to S3 is necessary and, thus, S3 is loaded in the register bank with a crossbar connect to source state S2. Because the "h" matched the transition condition for S2, the crossbar connection between S2 in the state slots 1106 and S3 in the transition slots 1108 initiates activation of S3. S2 becomes an inactive state because there is no transition from S1 that maintains the activity to S2. If state S3 is a terminal state, a token may be generated by the scanner and/or an action may be taken. Alternatively, the state machine 1120 may include additional states and transitions after state S3.

FIGS. 12A-12F are conceptual diagrams illustrating one embodiment of crossbar connections that are updated as a state machine is evaluated based on an input data stream. In FIGS. 12A-12F, the state slots 1230 are indicated on the vertical axis of the diagram and the transition slots 1240 are indicated on the horizontal axis of the diagram. The crossbar 1250 comprises a plurality of connections that are illustrated in a gridline pattern. When the crossbar is configured to add a connection (or tap) between a source state and a transition state, the connection is illustrated in FIG. 12 as a connection point 1260.

In one embodiment, when a state gets loaded into the register bank, appearing on both the horizontal and vertical axes of the exemplary register bank representation of FIG. 12, new crossbar connection points only appear in the row and the column associated with the newly loaded state. For example, FIG. 12A represents the state of the crossbar 1250 prior to receiving the exemplary input string 1210, wherein S0 is the only newly loaded state. FIG. 12A, as well as FIGS. 12B-12F, includes dashed rectangles around both the vertical and horizontal gridlines of newly loaded states, indicating the possible new connection points that may be established when the respective state is loaded. According to state machine 1220, S0 can spin to itself if it receives a character from the character class [abcd] or it can transition to S1 if it receives a character from the character class [abef]. Because S0 is the only state loaded in the register bank, the crossbar comprises a connection point 1260A (within the dashed rectangles) coupling S0 in the state slots 1230 to S0 in the transition slots 1240 (e.g., to communicate a spin transition).

Figure 12A:
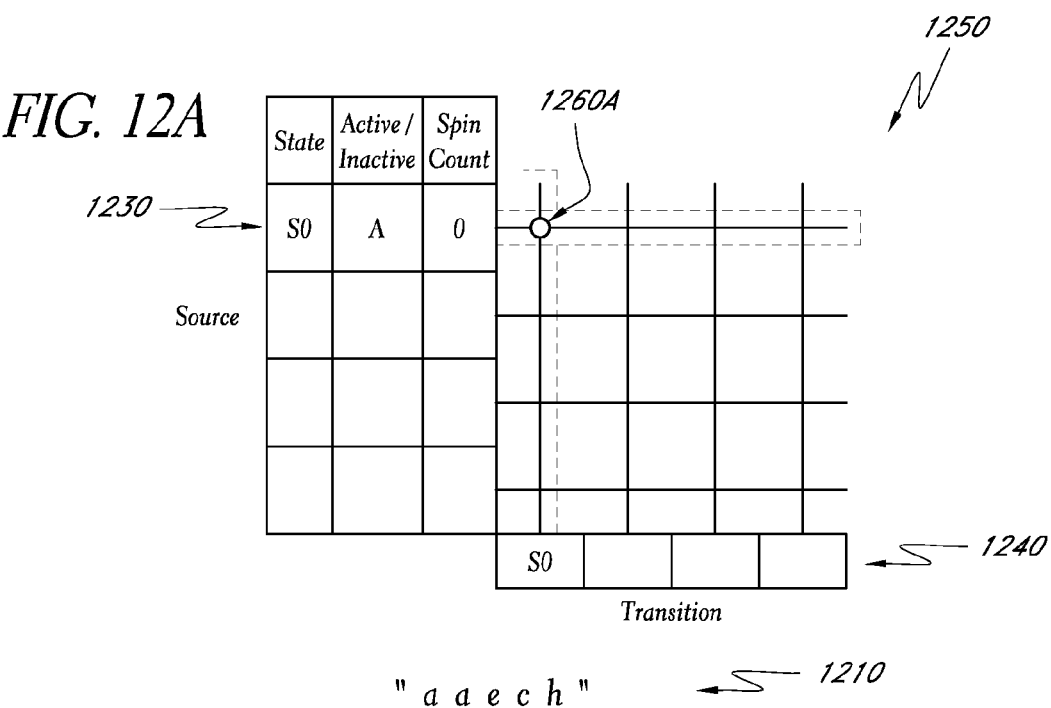
FIGS. 12A-12F are conceptual diagrams illustrating one embodiment of crossbar connections that are updated as a state machine is evaluated based on an input data stream.
Figure 12B:
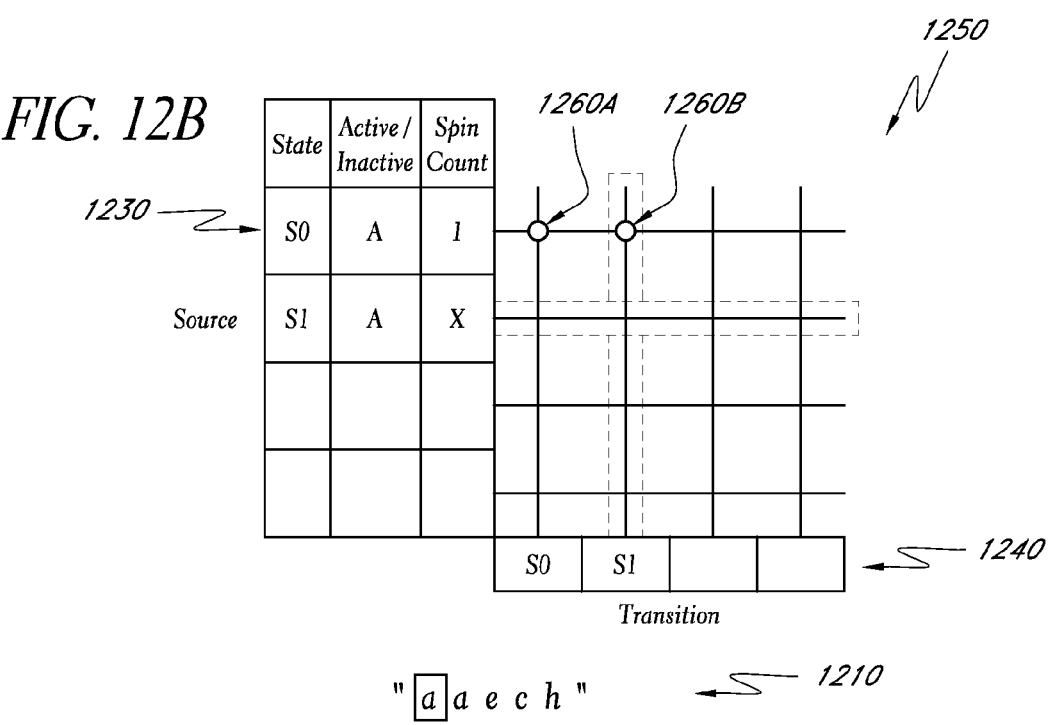

In FIG. 12B, the character "a" is processed and the slots and crossbar are updated accordingly. Because a transition to S1 becomes necessary with the processing of the "a", S1 is loaded in the in the second position of the register bank and the possible connection points are again indicated by the dashed rectangles. The new crossbar connection 1260B from S0 to S1 appears within this highlighted second column. In one embodiment, crossbar connections generally appear in the new state's column when it is a destination of an existing state, and in the new state's row when it is a source of an existing state (and in both, at the intersection, if it transitions to itself).

Figure 12C:
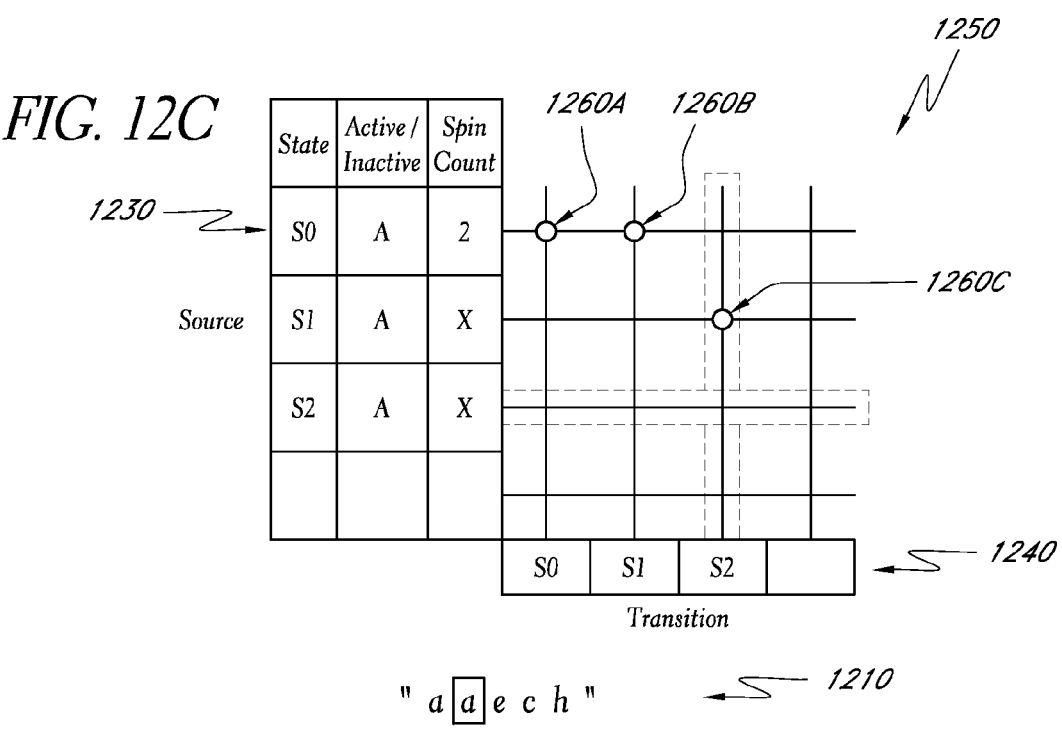

In FIG. 12C, the character "a" is processed and the slots and crossbar are updated accordingly. In particular, after receiving the second "a", S2 becomes an active state, such as in response to an activation signal transmitted via the crossbar connection 1260C from the S1 slot in the state slots 1230 to the S2 slot in the transition slots 1240. S0, S1 and S2 are now active states and the spin count for S0 is updated to 2.

Figure 12D:
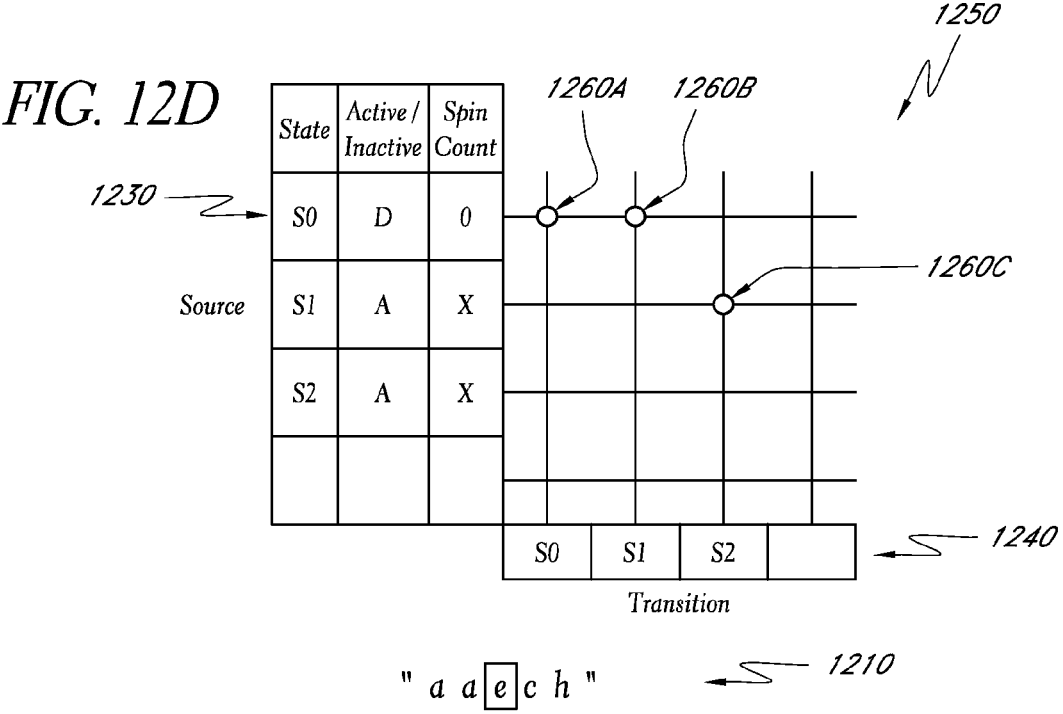

In FIG. 12D, the character "e" is processed and the slots and crossbar are updated accordingly. After receiving the "e", S0 becomes an inactive state. In this embodiment, the connection points remain even though S0 has been marked inactive. In general, crossbar connections may be maintained during inactivity of one or both of the connected states so that if a source needs to transition to an inactive destination, the crossbar connection still exists to facilitates it. Additionally, if an inactive source becomes active again by other means, and then needs to transition to its destination, the crossbar connection still exists to facilitate the connection. Alternatively, in other embodiments, the connection points for a state may be removed when the state becomes inactive.

Figure 12E:
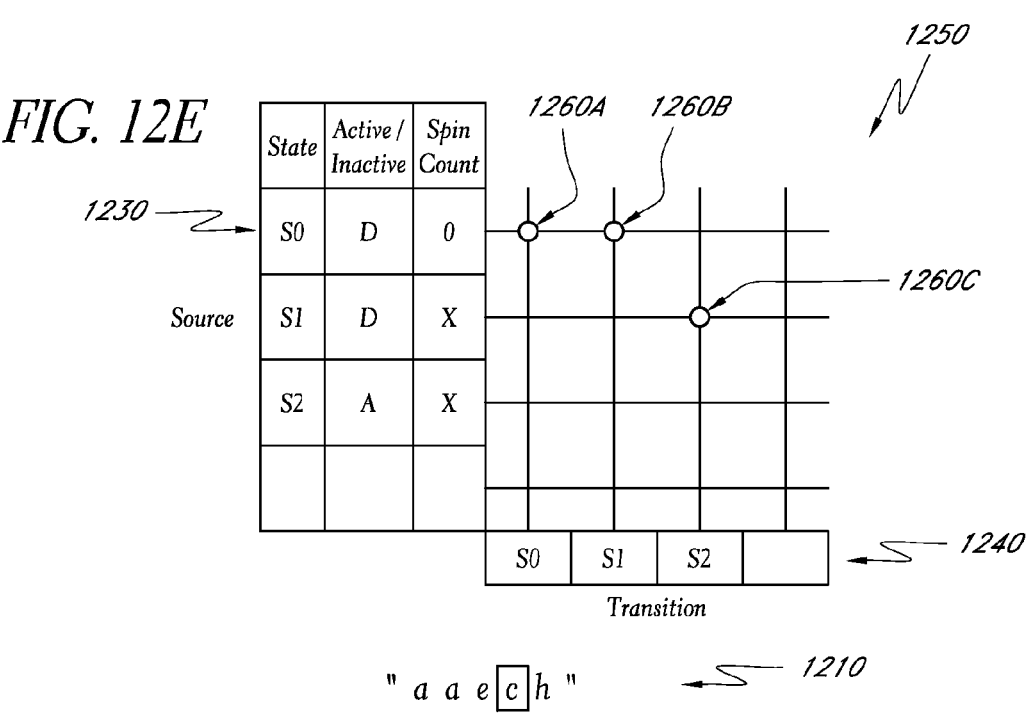
Figure 12F:
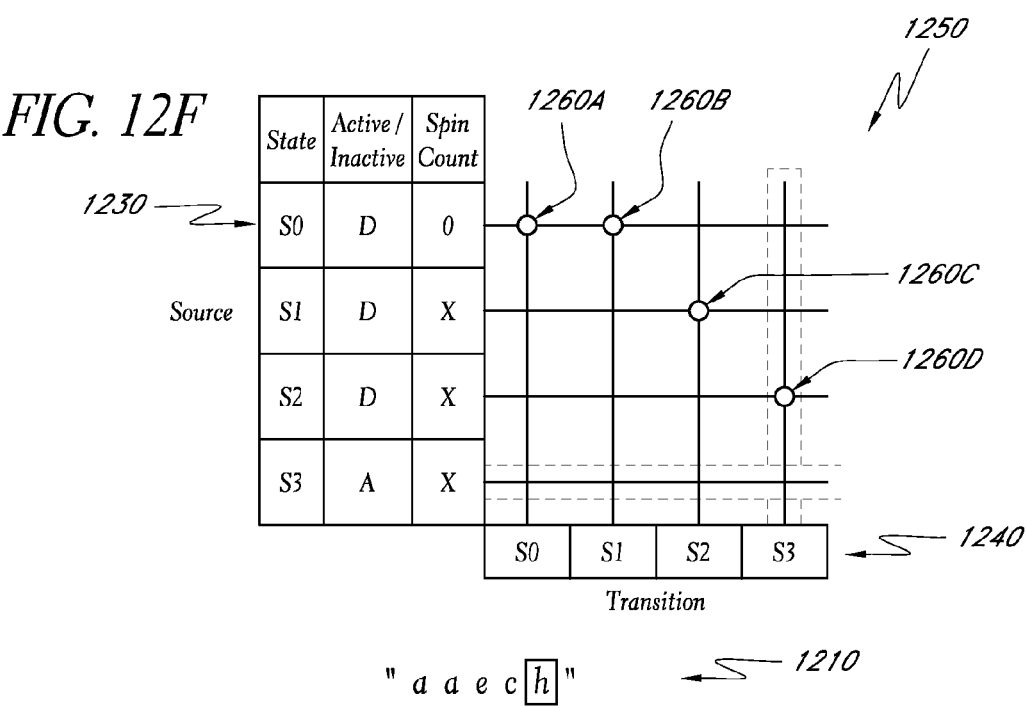

In FIG. 12E, the character "c" is processed and the slots and crossbar are updated accordingly. In particular, after receiving the "c", S1 becomes an inactive state . . . . At this stage of processing the input string 1210, S2 is the only remaining active state In FIG. 12F, the character "h" is processed and the slots and crossbar are updated accordingly. In particular, S3 becomes active and the crossbar is configured to connect S2 and S3. At this point, the state machine may output a token or execute another action.

Figure 13A:
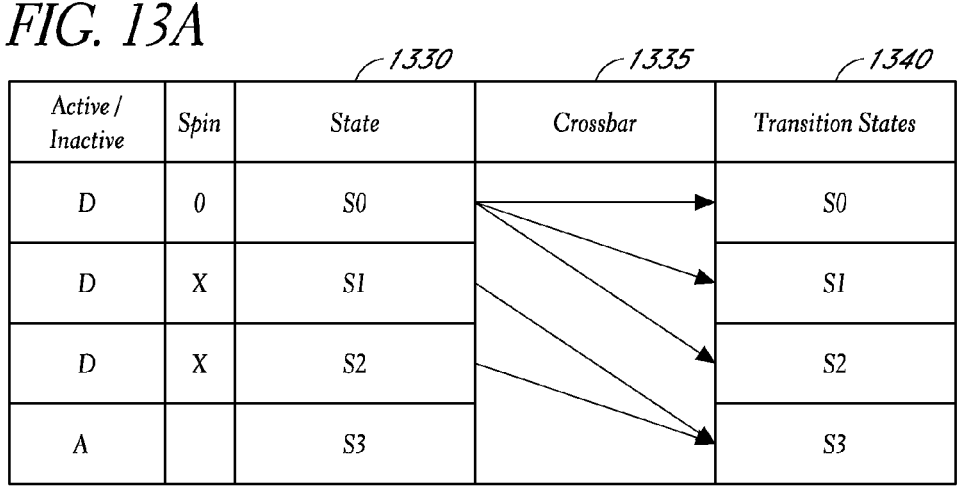
FIG. 13A is a conceptual diagram similar to FIGS. 11A-11F that illustrates how a crossbar, such as the crossbar of FIG. 6, is used in a NFA engine according to one embodiment

FIG. 13A is a conceptual diagram similar to FIGS. 11A-11F that illustrates how a crossbar, such as the crossbar of FIG. 6, is used in a NFA engine according to one embodiment. In FIG. 13A, an input string 1310 is processed by state machine 1320. The status of the state slots 1330, transition slots 1340, and the crossbar 1335 as illustrated in FIG. 13A assumes the state machine 1320 has already received the character "b" and that the register bank and crossbar have been configured with their corresponding transition states and crossbar connections. As shown in FIG. 13A, because either S1 or S2 can transition to S3, the crossbar comprises two connections to the transition slot for S3, one from each of S1 and S2.

Figure 13B:
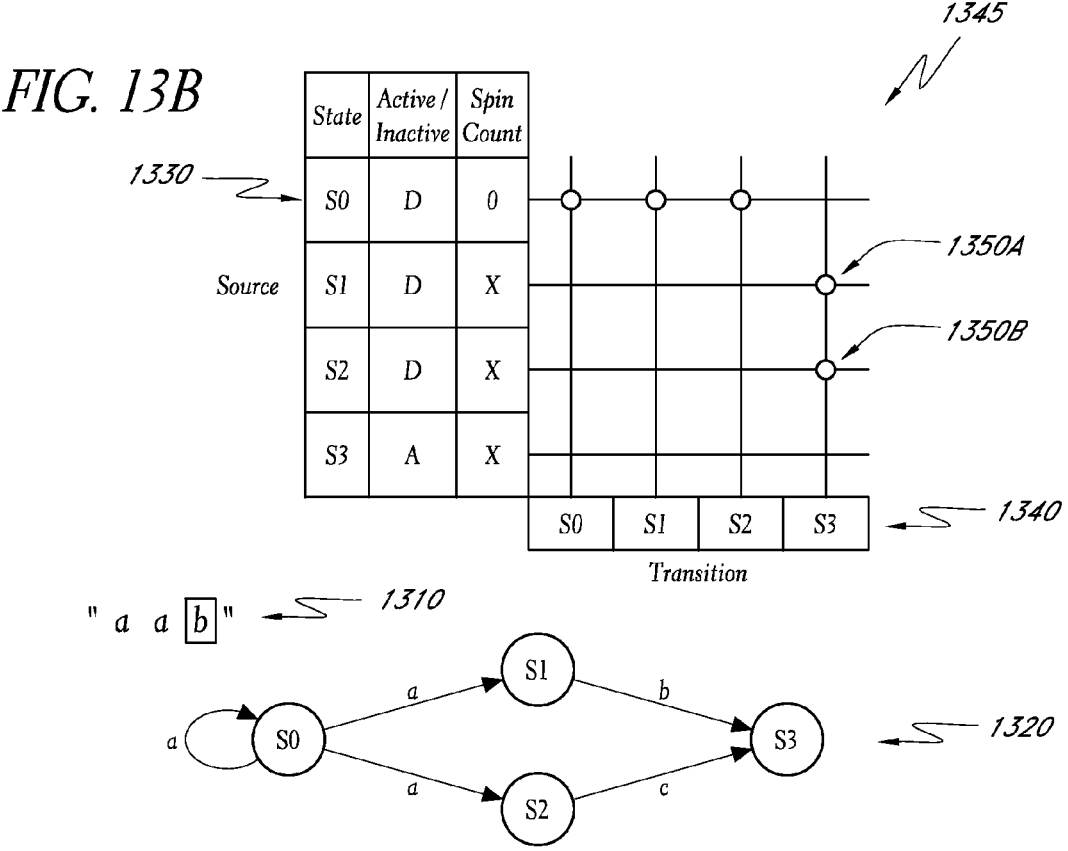
FIG. 13B is a conceptual diagram similar to FIGS. 12A-12F that illustrates connection points between connections from the spin slots and transition slots.

FIG. 13B is a conceptual diagram similar to FIGS. 12A-12F that illustrates connection points between connections from the spin slots 1330 and transition slots 1340. As with FIG. 13A, the status of the state slots 1330, transition slots 1340, and the crossbar 1345 as illustrated in FIG. 13B assume the state machine 1320 has already received the character "b" and that the register bank and crossbar have been configured with their corresponding transition states and crossbar connections. As shown in FIG. 13B, because either S1 or S2 can transition to S3, the crossbar comprises two connections to the transition slot for S3, one from each of S1 (connection point 1350A) and S2 (connection point 1350B).

As noted above, depending on the embodiment, the crossbars discussed with reference to FIGS. 11-13, for example, may be implemented with a number of different hardware devices (e.g., ASIC, FPGAs, or other reconfigurable logic) in a number of configurations. The examples of FIGS. 11-13 are provided as example implementations of crossbar functionality.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A method of tracking active states of a nondeterministic state machine during a process of traversing states of the state machine in response to characters of an input data stream, the method comprising:
   (a) loading state information associated with one or more states of the state machine into a register bank and marking as active the state information of at least one state, the state information for each state comprising one or more transition conditions associated with the state and one or more next states associated with respective transition conditions;
   (b) determining a next character of the input stream;
   (c) accessing the transition conditions of only the currently active states in order to determine one or more transition conditions that are satisfied by the next character;
   (d) marking as active in the register bank state information associated with one or more next states associated with the satisfied transition conditions;
   (e) marking as inactive in the register bank state information associated with any next states that are not associated with one or more satisfied transition conditions;
   (f) repeating steps (b)-(e) for each character of the input stream.

2. The method of claim 1, further comprising:
   initiating an action included in the state information associated with the one or more next states associated with the satisfied transition conditions.

3. The method of claim 1, further comprising:
   storing in the register bank respective spin counters for any states associated with transition conditions wherein one or more characters result in a transition to the same state, wherein each respective spin counter is incremented when the one or more characters is determined as the next character.

4. The method of claim 3, wherein the one or more next states associated with respective spin states are not marked as active until an associated spin counter reaches a spin quantity indicated in the transition condition.

5. A method of tracking a number of times a spin states of a nondeterministic state machine is sequentially accessed in response to respective transition conditions of the spin state matching sequential input characters of an input data stream, the method comprising:
   determining N bits of memory for tracking a spin count associated with the spin state, wherein N is greater than or equal to a predetermined quantity of accesses to the spin state that must occur in response to sequentially received input characters before a transition condition of the spin states is satisfied;

setting a value of each of the N bits to a first value;

receiving an input character matching a transition character indicating transition from the spin state to the spin state and, in response thereto, setting a first bit of the N bits to a second value;

in response to each sequentially received input character matching a transition character indicating a transition from the spin state to the spin state, setting a different bit of the N bits to a second value, wherein the bits set to the second value are indicative of one or more current spin counts associated with the spin state.

6. The method of claim 2 wherein the action comprises outputting a token.

7. The method of claim 1, further comprising:

loading new state information into the register bank, wherein the new state information is based at least in part on the transition conditions associated with active states that are satisfied by the next character.

8. The method of claim 7, further comprising:

initiating an action indicated in the state information associated with the one or more next states associated with the satisfied transition conditions.

9. The method of claim 7, further comprising:

storing in the register bank respective spin counters for any states associated with transition conditions wherein one or more characters result in a transition to the same state, wherein each respective spin counter is incremented when the one or more characters is determined as the next character.

10. The method of claim 9, wherein the one or more next states associated with respective spin states are not marked as active until an associated spin counter reaches a spin quantity indicated in the transition condition.

11. The method of claim 9, further comprising:

resetting the respective spin counter when the associated state is marked inactive.

12. The method of claim 8 wherein the action comprises outputting a token.

13. The method of claim 5, further comprising:

resetting the respective spin counter when the associated state is marked inactive.

14. The method of claim 5, further comprising resetting the values of each of the N bits to the first value when the spin state is marked inactive.

15. An apparatus for evaluating a state machine in response to a data string, the apparatus comprising:

a register bank comprising a plurality of state slots configured to selectively store information associated with states of the state machine;

a loader configured to selectively load state information associated with one or more states of the state machine into state slots of the register bank and to initiate marking of cettain states as active; and transition logic configured to access transition conditions associated with each of the states in the register bank that are marked as active, to determine one or more of the transition conditions that are satisfied by a next character of the data string, and to provide an indication of one or more next states indicate in the determined transition conditions to the loader, wherein the loader is configured to update the state information loaded in the register bank and the states that are marked as active based on the indication received from the transition logic.

16. The apparatus of claim 15, wherein the apparatus further comprises:

a reconfigurable connection matrix configured to dynamically create electrical connections between state slots associated with each of the currently active states and respective next states of the currently active states.

17. The apparatus of claim 15, wherein one or more of the register bank, the loader, and the transition logic are implemented in an integrated circuit (IC), an application-specific integrated circuit (ASIC), a field-programmable gate array (FPGA), a discrete logic component, or a plurality of logic gates.

18. The method of claim 15, wherein the apparatus further comprises:

a memory storing state information associated with one or more states of the state machine in respective memory locations of the memory, the state machine configured to detect patterns in an input data stream, wherein the state information stored in the memory is updated as the state machine is traversed in response to characters of the input data stream, the state information for each state comprising one or more transition conditions associated with respective states and one or more next states associated with respective transition conditions, the memory further storing an activity indicator for the one or more states indicative of which of the one or more states is currently active in evaluation of the input data stream; and a reconfigurable connection matrix configured to dynamically create signal paths between memory locations, so that signal paths are created between memory locations associated with each of the currently active states and respective memory locations associated with the next states associated with the respective currently active states.

19. The apparatus of claim 18, wherein the reconfiguration connection matrix comprises a field-programmable gate array (FPGA) that is reconfigured to create the signal paths when a state of the state machine becomes active.

20. The apparatus of claim 18, wherein the reconfigurable connection matrix comprises at least one of an integrated circuit (IC), an application-specific integrated circuit (ASIC), a field-programmable gate array (FPGA), a discrete logic component, and logic gates.

21. The apparatus of claim 18, wherein the reconfigurable connection matrix is implemented in a network interface card that is configured for interfacing with a network.

22. The apparatus of claim 18, wherein at least some signal paths comprises one or more transistors, logic gates, and resistors.

\* \* \* \* \*